(12) United States Patent
Galle et al.

(10) Patent No.: US 8,300,230 B2
(45) Date of Patent: Oct. 30, 2012

(54) SYSTEM AND METHOD TO DETERMINE CHROMATIC DISPERSION IN SHORT LENGTHS OF WAVEGUIDES USING A 3-WAVE INTERFERENCE PATTERN AND A SINGLE-ARM INTERFEROMETER

(75) Inventors: Michael Galle, Grimsby (CA); Waleed Mohammed, Nontaburi (TH); Li Qian, Toronto (CA)

(73) Assignees: Michael Galle, Grimsby, Ontario (CA); Waleed Mohammed, Nunthaburi (TH); Li Qian, Toronto, Ontario (CA)

( * ) Notice: Subject to any disclaimer, the term of this patent is extended or adjusted under 35 U.S.C. 154(b) by 260 days.

(21) Appl. No.: 12/738,106

(22) PCT Filed: Oct. 15, 2007

(86) PCT No.: PCT/CA2007/001824
§ 371 (c)(1),
(2), (4) Date: Jul. 5, 2010

(87) PCT Pub. No.: WO2009/049393
PCT Pub. Date: Apr. 23, 2009

(65) Prior Publication Data
US 2010/0296102 A1 Nov. 25, 2010

(51) Int. Cl.
*G01B 9/02* (2006.01)
(52) U.S. Cl. .................................................. 356/477
(58) Field of Classification Search .................. None
See application file for complete search history.

(56) References Cited

U.S. PATENT DOCUMENTS

| | | | | |
|---|---|---|---|---|
| 6,137,573 A | * | 10/2000 | Luke et al. | 356/453 |
| 6,804,008 B1 | * | 10/2004 | Morison et al. | 356/479 |
| 7,227,645 B2 | * | 6/2007 | Cyr | 356/491 |

OTHER PUBLICATIONS

P. Merrit, R. P. Tatam, and D.A. Jackson, "Interferometric chromatic dispersion measurements on short lengths of Monomode optical fiber," J. Lightwave Technol. 7, 703-716, 1989.
L. G. Cohen. "Comparison of single-mode fiber dispersion measurement techniques," J. Lightwave Technol. 3, 958-966 (1985).
B. Costa, D. Mazzoni, M. Puleo, E. Vezzoni, "Phase Shift Technique for the measurement of Chromatic Dispersion in Optical Fibers using LED's", IEEE Transactions on Microwave, 1982.
Agilent White Paper, "Agilent 86038B Photonic Dispersion and Loss Analyzer", Jan. 2007.
J. Brendel, H. Zbinden, and N. Gision, "Measurement of chromatic dispersion in optical fibers using pairs of correlated photons," Opt. Commun. 151, 35-39 (1998).

(Continued)

*Primary Examiner* — Tu Nguyen

(57) ABSTRACT

The present invention relates to a system and method to determine chromatic dispersion in short lengths of waveguides using a three wave interference pattern and a single-arm interferometer Specifically the invention comprises a radiation source operable to emit radiation connected to an apparatus for separating incident and reflected waves; the apparatus for separating incident and reflected waves having an output arm adjacent to a first end of the waveguide; the apparatus for separating incident and reflected waves connected to a detector; a collimating apparatus positioned at a second end of the waveguide; and a reflecting apparatus positioned at a balanced distance from the collimating apparatus operable to reflect a test emission from the radiation source back through the collimating apparatus, the waveguide, and the apparatus for separating incident and reflected waves thereby generating an interference pattern that is recorded by the detector.

30 Claims, 14 Drawing Sheets

OTHER PUBLICATIONS

L. Cherbi, M. Mehenni, and R. Aksas, Experimental Investigation of the Modulation Phase-Shift Method for the Measure of the Chromatic Dispersion in a Single-Mode fiber coiled, 2005.

Y.O. Noh, D.Y. Kim, S.K. Oh, U.C. Pack. "Dispersion measurements of a short length optical fiber using Fourier transform spectroscopy", ThB5, Cleo, Pacific Rim '99 pp. 599-600, 1999.

D. D Shellee and K. B. Rochford, "Low-coherence interferometric measurements of the dispersion of multiple fiber bragg gratings," IEEE Photon. Technol. Lett. 13, 230-232 (2001.

J. Gehler and W. Spahn, "Dispersion measurement of arrayed-waveguide grating by Fourier transform spectroscopy," Electron. Lett. 36, 338-340 (2000).

P. Hamel, Y. Jaouen and R. Gabet, "Optical low-coherence reflectometry for complete chromatic dispersion characterization of few-mode fibers," Opt. Letts. vol. 32, No. 9, 2007.

F. Hakimi, H. Hakimi. "Measurement of optical fiber dispersion and dispersion slope using a pair of short optical pulses and Fourier transform property of dispersive medium", 2000.

C. Palavicini, Y. Jaouën, G. Debarge, E. Kerrinckx, Y. Quiquempois, M. Douay, C. Lepers, A.-F. Obaton, G. Melin, Phase-sensitive optical low-coherence reflectometry technique, 2004.

A. Wax, C. Yang, and J.A. Izatt, "Fourier-domain low-coherence interferometry for light-scattering spectroscopy," Opt. Lett. 28, 1230-1232 (2003).

K. Takada, I. Yokohama, K. Chida, and J. Noda, "New measurement system for fault location in optical waveguide devices based on an interferometric technique," Appl. Opt. 26, 1, 1987.

R. K. Hickernell, T. Kaumasa, M. Yamada, M. Shimizu, M. Horiguchi. "Pump-induced dispersion of erbium-doped fiber measured by Fourier-transform spectroscopy", Opt. Lett. vol., 1993.

C. D. Dorrer, N. Belabas, J. P. Likforman, and M. Joffre, "Spectral resolution and sampling in Fourier transform spectral interferometry," J. Opt. Soc. Am. B 17, 1795-1802, 2000.

C. Dorrer, "Influence of the calibration of the detector on spectral interferometry", J.Opt. Soc. Am. B, 16, No. 7 (1999).

P. Hlubina, White-light spectral interferometry to measure intermodal dispersion in two-mode elliptical core optical fibers, Opt. Commun. 218, 283-289 (2003).

P. Hlubina, T. Martynkien, and W. Urbanczyk, "Dispersion of group and phase modal birefringence in elliptical-core fiber measured by white-light spectral interferometry," Opt., 2003.

J. Tignon, M. V Marquezini, T. Hasch, and D. S. Chemals, "Spectral interferometry of semiconductor nanostructures," IEEE J. Quantum Electron. 35, 510-522 (1999).

A.B. Vakhtin, K. A. Peterson, W. R. Wood, and D. J. Kane, "Differential spectral interferometry and imaging technique for biomedical applications," Opt. Lett. 28, 1332-1334, 2003.

D. Huang, E. A. Swang, C. P. Lin, J. S. Schuman, W. G. Stinson, W. Chang, M. R. Hee, T. Flotte, K. Gregory, C. A. Puliafito, and J. G. Fugimoto, Optical coherence tomography, 1991.

B. Auguie, A. Mussot, A. Boucon, E. Lantz, and T. Sylvestre, "Ultralow Chromatic Dispersion Measurement of Optical Fibers With a Tunable Fiber Laser," IEEE Photon. Tech. Lett., 2006.

J.Y. Lee and D.Y. Kim, "Versatile chromatic dispersion measurement of a single mode fiber using spectral white light interferometry," Opt. Express, vol. 14, No. 24, 11608-11, 2006.

H.T. Shang, "Chromatic dispersion measurement by white light interferometry on meter length single-mode optic fibers," Electron. Letts., vol. 17, p. 603 (1981).

Andrei B. Vakhtin, Daniel J. Kane, William R. Wood, and Kirsten A. Peterson. "Common-path interferometer for frequency-domain optical coherence tomography", Applied Optics, vo, 2003.

U. Sharma, N.M. Fried, J.U. Kang, "All-fiber common-path optical coherence tomography: sensitivity optimization and system analysis", IEEE Journal of Selected Topics in Quantu, 2005.

\* cited by examiner

SYSTEM AND METHOD TO DETERMINE CHROMATIC DISPERSION IN SHORT LENGTHS OF WAVEGUIDES USING A 3-WAVE INTERFERENCE PATTERN AND A SINGLE-ARM INTERFEROMETER

FIELD OF THE INVENTION

This invention relates to a system and method to measure chromatic dispersion in short lengths of waveguides using a three wave interference pattern and a single arm interferometer.

BACKGROUND OF THE INVENTION

One of the main components in a photonic device is a waveguide or an optical fiber which serves as a low-loss medium for light transmission. An important characteristic of waveguides such as optical fiber is the dispersion that light experiences as it travels inside the waveguide. Dispersion is the phenomenon that causes different frequencies of light to travel at different velocities. The phenomenon of dispersion is commonly observed through the spreading of light by a prism. When white light, which contains a broad spectrum of frequencies, enters a prism the different wavelengths are bent at different angles since each frequency sees a different index of refraction, a phenomenon first quantified by Newton in the 17th century. Inside a fiber, this variation in the index of refraction with frequency is what causes the frequency dependence of the velocity.

A more modern example of the phenomenon of dispersion is the affect it has on the performance of photonic devices used in communication systems. In these systems, dispersion, or more specifically second order dispersion, leads to a broadening of the pulses used to represent 1 or 0 in a digital communication system. Pulse broadening causes adjacent bits to overlap and leads to intersymbol interference. Intersymbol interference occurs when a pulse is broadened beyond its allocated bit slot to such an extent that it begins to overlap with adjacent bits and it is no longer possible to determine whether or not a specific bit contains a 1 or a 0.

As a result of intersymbol interference the allocated bit slots must be widened and this effectively lowers the number of bits that can be transmitted in a given period of time and reduces the system bandwidth. As a result modern communication systems have evolved methods to mitigate the effects of dispersion.

Current methods of countering the effects of dispersion in an optical fiber use dispersion compensating devices such as chirped fiber Bragg gratings and dispersion compensating fiber (DCF). In order to effectively use these techniques it is important to know the exact magnitude of the dispersion that is being compensated for. As a result, knowledge of the dispersion in both the transmission system and the dispersion compensation system is important to the design of the overall communication system.

Knowledge of dispersion in a waveguide is also significant for the study of fiber based nonlinear wave interaction phenomena. An optical soliton is a pulse that maintains a constant shape (width) as it propagates along a fiber (first order soliton) or has a shape that is periodic with propagation (higher order soliton). This is due to the fact that the effects of dispersion and self phase modulation (SPM) are in balance. SPM is the effect whereby the phase of a given pulse is modified by its own intensity profile. Knowledge of the dispersion in an optical fiber allows for the determination of the required intensity for the formation of an optical soliton. This effect has also been used in the area of soliton effect pulse compression where the combination of the chirping effect of SPM and subsequent distributed compression effect of negative dispersion is used to compress an optical pulse. Knowledge of dispersion is also important for the study of nonlinear effects such as second harmonic generation, three-wave mixing and four-wave mixing since it determines the interaction lengths between the various wavelengths. Dispersion is particularly important in techniques that aim to extend this interaction length such as in Quasi Phase Matching (QPM) devices.

Theory on Chromatic Dispersion of a Waveguide

Dispersion is the phenomenon whereby the index of refraction of a material varies with the frequency or wavelength of the radiation being transmitted through it. The term 'Chromatic Dispersion' is often used to emphasize this wavelength dependence. The total dispersion in a waveguide or an optical fiber is a function of both the material composition (material dispersion) and the geometry of the waveguide (waveguide dispersion). This section outlines the contributions of both material and waveguide dispersion, identifies their physical source and develops the mathematical terminology for their description.

Dispersion in a Waveguide

When light is confined in a waveguide or an optical fiber the index is a property of both the material and the geometry of the waveguide. The waveguide geometry changes the refractive index via optical confinement by the waveguide structure. The refractive index is therefore a function of both the material and waveguide contributions. For this reason in a fiber or a waveguide the index is known as an effective index.

The dispersion parameter, D, which represents second order dispersion since it describes how the second derivative of the effective index varies with respect to wavelength:

$$D(\lambda_o) = -\frac{\lambda_o}{c} \frac{d^2 n_{\textit{eff}}}{d\lambda^2}\bigg|_{\lambda_o} \quad \text{Eq. 1}$$

The dispersion parameter is important since it is related to pulse broadening which greatly limits the bit rate of a communication system.

The dispersion parameter of a waveguide such as an optical fiber is given by the total dispersion due to both the material and waveguide contributions. The total dispersion is the combination of the material dispersion and the waveguide dispersion and thus the dispersion parameter of a waveguide is given by:

$$D = -\frac{2\pi c}{\lambda^2}\frac{d}{d\omega}\left(\frac{1}{V_G}\right) = D_M + D_W \quad \text{Eq. 2}$$

The next two sections discuss the contributions that both material and waveguide dispersion make individually to the total dispersion.

Material Dispersion

Material dispersion originates from the frequency or wavelength dependent response of the atoms/molecules of a material to electromagnetic waves. All media are dispersive and the only non-dispersive medium is a vacuum. The source of material dispersion can be examined from an understanding of the atomic nature of matter and the frequency dependent aspect of that nature. Material dispersion occurs because atoms absorb and re-radiate electromagnetic radiation more efficiently as the frequency approaches a certain characteristic frequency for that particular atom called the resonance frequency.

When an applied electric field impinges on an atom it distorts the charge cloud surrounding that atom and induces a polarization that is inversely proportional to the relative difference between the frequency of the field and the resonance frequency of the atom. Thus the closer the frequency of the electromagnetic radiation is to the atoms resonance frequency the larger the induced polarization and the larger the displacement between the negative charge cloud and the positive nucleus.

The material dispersion is then determined by taking the derivative of the group index of the material with respect to wavelength or equivalently the second derivative of the absolute index with respect to wavelength:

$$D_M = \frac{1}{c}\frac{dN_G}{d\lambda} = -\frac{\lambda}{c}\left(\frac{d^2n}{d\lambda^2}\right) \qquad \text{Eq. 3}$$

Waveguide Dispersion

Waveguide dispersion occurs because waveguide geometry variably affects the velocity of different frequencies of light. More technically, waveguide dispersion is caused by the variation in the index of refraction due to the confinement of light in an optical mode. Waveguide dispersion is a function of the material parameters of the waveguide such as the normalized core-cladding index difference, $\Delta = (n_{core} - n_{cladding})/n_{core}$ and geometrical parameters such as the core size, a. The index in a waveguide is known as an effective index, $n_{eff}$, because of the portion of the index change caused by propagation in a confined medium.

Confinement is best described by a quantity known as the V parameter, which is a function of both the material and geometry of the waveguide. The V parameter is given by Eq. 4:

$$V(\lambda) = \frac{2\pi}{\lambda}a(n_{core}^2 - n_{cladding}^2)^{1/2} \approx \frac{2\pi}{\lambda}an_{core}\sqrt{2\Delta} \qquad \text{Eq. 4}$$

Propagation in a waveguide is described by a quantity known as the normalized propagation constant, b, which is also a function of the material and geometry of the waveguide. This quantity is given in Eq. 5:

$$b = \frac{n_{eff} - n_{cladding}}{n_{core} - n_{cladding}} \qquad \text{Eq. 5}$$

The contribution of the waveguide to the dispersion parameter depends on the confinement and propagation of the light in a waveguide and hence it is a function of both the V parameter and the normalized propagation constant, b. The waveguide dispersion can be calculated via knowledge of V and b via Eq. 6:

$$D_W = -\frac{2\pi}{\lambda^2}\left[\frac{N_{G(cladding)}^2}{n_{cladding}\omega}\frac{Vd^2(Vb)}{dV^2} + \frac{dN_{G(cladding)}^2}{d\omega}\frac{d(Vb)}{dV}\right] \qquad \text{Eq. 6}$$

In most cases the main effect of the waveguide dispersion in standard single mode fibers is a reduction in dispersion compared to dispersion in bulk. In comparison to material dispersion the contribution of waveguide dispersion is quite small and in most standard single mode fibers it only shifts the zero dispersion wavelength from 1276 nm to 1310 nm.

In summary, the dispersion in a waveguide or an optical fiber is caused not only by the material but also by the effect of confinement and propagation in the waveguide. Thus accurate knowledge of the dispersion in a waveguide cannot be made by simple knowledge of the material dispersion but must include the effect of the waveguide. As a result either the dimensions of the waveguide must be known to a high degree of accuracy so that the waveguide dispersion can be calculated (which is not easy since fabrication processes are hardly perfect) or the dispersion must be measured empirically. Accurate measurement of the (total) dispersion parameter, D, is important to the design of photonic systems.

Polarization Mode Dispersion

In addition to the above, optical waveguides may suffer from polarization mode dispersion (PMD). PMD may exist in fibers with asymmetrical cores. In optical fibers, the light that travels along one of the two polarization axis travels at a right angle to light traveling along the other axis. In asymmetrical optical fibers, the light travels along the two axes at different speeds. This causes pulses to spread, which can cause them to become undetectable at the detector.

Conventional Measurement Techniques

There are 3 categories of dispersion measurement techniques: Time of flight (TOF), Modulation phase shift (MPS) and Interferometric. TOF and MPS are the most widely used commercial dispersion measurement techniques. Interferometric techniques are not widely used commercially but have been used in laboratories for dispersion measurements. Interferometric techniques come in two forms; temporal and spectral. The existing techniques differ in measurement precision and fiber length requirements.

Time of Flight Technique

In the TOF technique the second order dispersion parameter, D, hereafter referred to simply as the dispersion parameter, can be determined either by measuring the relative temporal delay between pulses at different wavelengths or by measuring the pulse broadening itself. The relative temporal delay between pulses at different wavelengths is measured to determine the group velocity which can then be used to determine the dispersion parameter using Eq. 7:

$$D(\lambda_o) = \frac{\Delta t}{L\Delta\lambda(\lambda_o)} \qquad \text{Eq. 7}$$

The above equation can also be used to determine the dispersion parameter from the pulse broadening itself if $\Delta t$ is the measured pulse broadening and $\Delta\lambda$ is the bandwidth of the wavelengths in the pulse. The measurement precision achievable by the TOF technique is on the order of 1 ps/nm.

One of the main problems with the TOF technique is that it generally requires several kilometers of fiber to accumulate an appreciable difference in time for different wavelengths. Another issue with the TOF technique when the pulse broadening is measured directly is that the pulse width is affected by changes in the pulse shape which leads to errors in the measurement of the dispersion parameter. As a result, in order to measure the dispersion parameter with a precision near 1 ps/nm-km several kilometers of fiber are required.

Modulation Phase Shift Technique

The MPS technique is another dispersion characterization technique that requires long lengths of fiber. In the MPS technique, a continuous-wave optical signal is amplitude modulated by an RF signal, and the dispersion parameter is determined by measuring the RF phase delay experienced by the optical carriers at the different wavelengths.

The RF phase delay information is extracted by this technique, and by taking the second derivative of the phase information, the dispersion parameter can be determined. Measurement precision achievable by the MPS technique is on the order of 0.07 ps/nm. Due to its higher precision, MPS has become the industry standard for measuring dispersion in optical fibers. However, MPS has several disadvantages. The first is that it is expensive to implement since the components required such as an RF analyzer and a tunable laser, are costly. The second is that its precision is limited by both the stability and jitter of the RF signal.

MPS has several limitations on the minimum device length that it is capable of characterizing. In the MPS method the width of the modulated signal limits the minimum characterizable device length. This method also typically requires fiber lengths in excess of tens of meters to obtain a precision to better than 1 ps/nm-km. Therefore it is not desirable for the characterization of specialty fibers or gain fibers, of which long fiber lengths are expensive to acquire or not available. Also, when fiber uniformity changes significantly along its length, the dispersion of a long span of fiber cannot be used to accurately represent that of a short section of fiber. In such cases, dispersion measurement performed directly on short fiber samples is desirable. As a result a technique for measuring the dispersion of short lengths of fiber is desired.

Dispersion Measurements on Short Length

Interferometric techniques are capable of characterizing the dispersion on fiber lengths below 1 m. There are two categories of interferometric techniques for making dispersion measurements on fiber of short length: temporal and spectral.

Temporal Interferometry (Fourier Transform Spectroscopy)

Dual Arm temporal interferometry employs a broadband source and a variable optical path to produce a temporal interferogram between a fixed path through the test fiber and variable air path. It involves moving one arm of the interferometer at a constant speed and plotting the interference pattern as a function of delay length (time). The spectral amplitude and phase are then determined from the Fourier transform of the temporal interferogram.

A temporal interferogram gives the phase variation as a function of time. The spectral phase variation can be extracted from the temporal interferogram if a Fourier Transform is applied to it. The spectral phase contains the dispersion information which can be indirectly obtained by taking the second derivative of the spectral phase. A precision of 0.0015 ps/nm measured on a 0.814-m-long photonic crystal fiber was recently reported using temporal interferometry. The main disadvantage of temporal interferometry is that it is susceptible to noise resulting from both translation inaccuracy and vibration of the optics in the variable path. A tracking laser is typically required to calibrate the delay path length. Another problem with this technique is that a second derivative of the phase information must be taken to obtain the dispersion parameter which means that it is less accurate than a method that can obtain the dispersion parameter directly.

Spectral Interferometry

Spectral interferometry, like temporal interferometry, is capable of characterizing the dispersion in short length fiber (<1 m). In spectral interferometry, instead of stepping the length of one of the arms, a scan of the wavelength domain performed to produce a spectral interferogram. Spectral interferometry is generally more stable than temporal interferometry since the arms of the interferometer are kept stationary. Thus it is simpler than temporal interferometry since no tracking laser is necessary.

There are two types of spectral interferometry, one is general and does not require balancing, and another, the special case, is 'balanced'. In the balanced case it is possible to directly measure the dispersion parameter from the interferogram. This makes it more accurate than temporal interferometry and it is for this reason that spectral interferometry is discussed as a dispersion measurement technique.

In general spectral interferometry the dispersion parameter is obtained from the interference spectrum produced by two time delayed light pulses/beams in an unbalanced dual arm interferometer. Two pulses/beams from the two arms of the interferometer are set up to interfere in a spectrometer and a spectral interferogram is produced. The interference pattern produced for a given time or phase delay is given by:

$$I(\omega) = |E_o(\omega) + E(\omega)\exp(i\omega\tau)|^2 \qquad \text{Eq. 8}$$
$$= |E_o(\omega)|^2 + |E(\omega)|^2 + E_o^*(\omega)E\omega(\omega)\exp(i\omega\tau) +$$
$$E_o(\omega)E^*(\omega)\exp(-i\omega\tau)$$
$$= |E_o(\omega)|^2 + |E(\omega)|^2 + f(\omega)\exp(i\omega\tau) +$$
$$f^*(\omega)\exp(-i\omega\tau)$$

The last two terms in Eq. 8 result in spectral interference pattern via a $\cos(\Delta\phi(\omega)+\omega\tau)$ term.

There are several ways to extract the phase information from the cosine term but the most prevalent way to do so is to take the Inverse Fourier transform of the spectral interference pattern. Note that $f(\omega)=F.T.f(t)=|E^*_o(\omega)E(\omega)|\exp(i\Delta\phi(\omega))$ contains all the phase information on the spectral phase difference $\Delta\phi(\omega)$. Therefore, if $f(\omega)$ can be extracted from the interference pattern then the phase difference information can be known. If an Inverse Fourier Transform of the spectral interference is performed on the interference pattern the following is obtained:

$$F.T.^{-1}(I(\omega))=E^*_o(-t)\hat{x}E_o(t)+E^*(-t)\hat{x}E(t)+f(t-\tau)+f(-t-\tau) \qquad \text{Eq. 9}$$

If all terms except the $f(t-\tau)$ term get filtered out via a band pass filter then the phase information can be extracted from a Fourier Transform on $f(t-\tau)$.

The phase information can then be extracted by applying a Fourier Transform to the filtered component $f(t-\tau)$ thereby transferring it back to the spectral domain. The complex amplitude therefore becomes $f(\omega)=|E_o(\omega)||E(\omega)|\exp(i\Delta\phi(\omega)+\omega r)$. The phase of this complex amplitude minus the linear part ($\omega\tau$) that is due to the delay, yields the spectral phase difference between the two pulses as a function of $\omega$ and is independent of the delay between the two pulses. In this way the phase difference between the two pulses can be obtained.

If one of the pulses travels through a non-dispersive medium such as air and the other pulse travels through a dispersive medium such as an optical fiber then the phase difference spectrum will be directly related to the dispersion in the fiber. Thus the dispersion parameter plot can be determined by taking the second derivative of the phase difference spectrum with respect to wavelength.

The main issue with this form of spectral interferometry, however, is that the dispersion parameter is not determined directly but rather via a second order derivative of the phase information with respect to wavelength. Therefore, like temporal interferometry, this general unbalanced method of spectral interferometry is not as accurate as the balanced method capable of measuring the dispersion parameter directly of the present invention.

In balanced spectral interferometry the arm lengths of an interferometer are kept constant and they are balanced for a given wavelength called the central wavelength such that the group delay in both arms is the same. This allows for the removal of the effect of the large linear dispersion term in the interferogram. Balanced interferometry measures the dispersion parameter D at the wavelength at which the group delay is the same in both arms. This wavelength is henceforth referred to as the central wavelength. The dispersion parameter in this case can be directly determined from the phase information in the spectral interferogram without differentiation of the phase. For this reason it is more accurate than both unbalanced general spectral interferometry and temporal interferometry. As a result balanced spectral interferometry is often used to obtain accurate dispersion measurements in short length waveguides and fibers.

Both forms of spectral interferometry are considered to be less susceptible to noise since the arms of the interferometer are kept still and there are no moving parts. It is for this reason that spectral interferometry in general is considered to be more accurate than temporal interferometry. Spectral interferometry is therefore considered to be the technique of choice for measuring the dispersion of photonic components and spectral depth resolved optical imaging. One well known and important class of spectral interferometry is optical coherence tomography (OCT).

Balanced dual arm spectral interferometers are typically found in a Michelson or a Mach-Zehnder configuration in which the path lengths are equalized at the given wavelength in which the dispersion is to be measured. The most often used configuration, however, is the Michelson and the discussion that follows considers the Michelson interferometer. In a balanced Michelson interferometer the dispersion is measured from the interference between two waves: one that passes through the test fiber and another that passes through an air path. Balancing the air path length with the fiber eliminates the effect of the group index of the fiber in the interference pattern. This allows for the measurement of the second derivative of the effective index with respect to wavelength directly from the interference pattern.

The main disadvantage of this Michelson configuration is that two types of path balancing must occur simultaneously. The first type of path balancing is coupler arm balancing wherein the coupler arms need to be balanced exactly or an extra set of interference fringes will be created from the reflections at the two end facets of the coupler arms as shown in FIG. 1.

The second type of balancing is test fiber-air path balancing to ensure that the optical path length in the air path exactly equals that of the fiber for a given central wavelength. This ensures that the central wavelength in the interference pattern is within the viewable bandwidth of the OSA.

The main problem in implementing a Michelson interferometer is that the arms of the coupler cannot be balanced exactly and as a result the effect of the extra set of reflections produced at the coupler facets cannot be removed.
Comparison of Dispersion Measurement Techniques There have been several techniques developed for the measurement of chromatic dispersion in fiber. Especially important are those developed for the measurement of short lengths of fiber. One reason that short length characterization techniques are important stems from recent developments in the design and fabrication of specialty fiber.

Specialty fiber such as Twin Hole Fiber (THF) (FIG. 14) and Photonic Crystal Fiber (PCF) have made short length fiber characterization desirable due to their high cost. Because of this it is not economical to use TOF and MPS techniques to characterize these types of fiber. Another impetus for short length characterization comes from the fact that in many specialty fibers the geometry is often non-uniform along its length. As a result of this non-uniformity the dispersion in these fibers varies with position. Thus measurement of the dispersion in a long length of this fiber will be different than that measured in a section of the same fiber.

Based on the above discussion, the technique of choice for dispersion measurement is balanced spectral interferometry since it will provide the most accurate measurements. As a result the new technique will employ balanced spectral interferometry.

The two important parameters in comparing dispersion measurement techniques are the minimum device length that each is capable of characterizing and the precision to which the characterization is achieved. It is generally desirable to characterize as short a fiber as possible with as high a precision as possible. It is also desirable to perform the measurement in the simplest way possible.

Therefore, what is needed is a new method for the measurement of dispersion that does not require the cancellation of any extra fringes. What is also needed is a method to measure the dispersion parameter in short lengths of optical fiber. The initial need for a short length characterization scheme came from the need to measure the dispersion of a specialty fiber such as THF, PCF, or gain fibre. This requirement is based on the expense of fibre, nonlinear wave interaction phenomena in fibre, and non-uniform dispersion along the length of a fibre.

SUMMARY OF THE INVENTION

According to the present invention, a system and method to determine chromatic dispersion in short lengths of waveguides using a three wave interference pattern and a single-arm interferometer has been developed.

In a first aspect, the present invention relates to an interferometer system for obtaining a measure of the chromatic dispersion of a waveguide comprising a radiation source operable to emit radiation connected to a means for separating incident and reflected waves; the means for separating incident and reflected waves having an output arm adjacent to a first end of the waveguide; the means for separating incident and reflected waves further connected to a detector; a collimating means positioned at a second end of the waveguide; and a reflecting means positioned at a balanced distance from the collimating means operable to reflect a test emission from the radiation source back through the collimating means, the waveguide, and the means for separating incident and reflected waves thereby generating an interference pattern that is recorded by the detector;

In a second aspect of the present invention said interference pattern consists of three waves wherein a first wave is a reflection of the test emission from one facet of the waveguide, a second wave is a reflection of the test emission from a second facet of the waveguide and a third wave is a reflection of the test emission from the reflecting means.

In another aspect, the present invention relates to an interferometric method for obtaining a measure of the chromatic dispersion of a waveguide comprising the steps of:

a. connecting a radiation source to a means for separating incident and reflected waves, said means for separating incident and reflected waves having an output arm terminating at a connector;
b. placing a first facet of the waveguide adjacent to the connector;
c. connecting the means for separating incident and reflected waves to a detector;
d. placing a collimating lens at a second facet of the waveguide;
e. positioning a reflecting means at a balanced distance from the collimating lens;
f. generating a radiation emission from the radiation source;
g. recording an interferogram consisting of three waves with the detector wherein the first wave is a reflection of the radiation emission from the first facet of the waveguide, the second wave is a reflection of the radiation emission from the second facet of the waveguide, and the third wave is a reflection of the radiation emission from the reflecting means; and
h. measuring dispersion parameters from the recorded interferogram.

In a still further aspect of the present invention relates to a method for increasing a maximum length of a waveguide for which chromatic dispersion may be measured using an interferometer comprising the steps of:
a. generating an interferogram including sampling a radiation intensity at each of a set of wavelengths, each said wavelength separated by a step size of a tunable laser;
b. selecting a set of wavelength windows, each said wavelength window including a portion of the interferogram corresponding to one or more of said wavelengths, the set of wavelength windows encompassing the whole of the interferogram, the set of wavelength windows not overlapping at any given portion of the interferogram;
c. selecting a maximum radiation intensity measured in each of said wavelength windows; and
d. connecting the maximum radiation intensities of each said wavelength window together to form a wavelength envelope.

BRIEF DESCRIPTION OF THE DRAWINGS

The invention will be better understood with reference to the drawings.

The accompanying drawings, which are incorporated in and constitute a part of the specification, illustrate various example systems and methods and are not intended to limit the scope of the specification.

DETAILED DESCRIPTION OF THE INVENTION

System Operation
1: Development of Single Arm Interferometry

Figure 1:
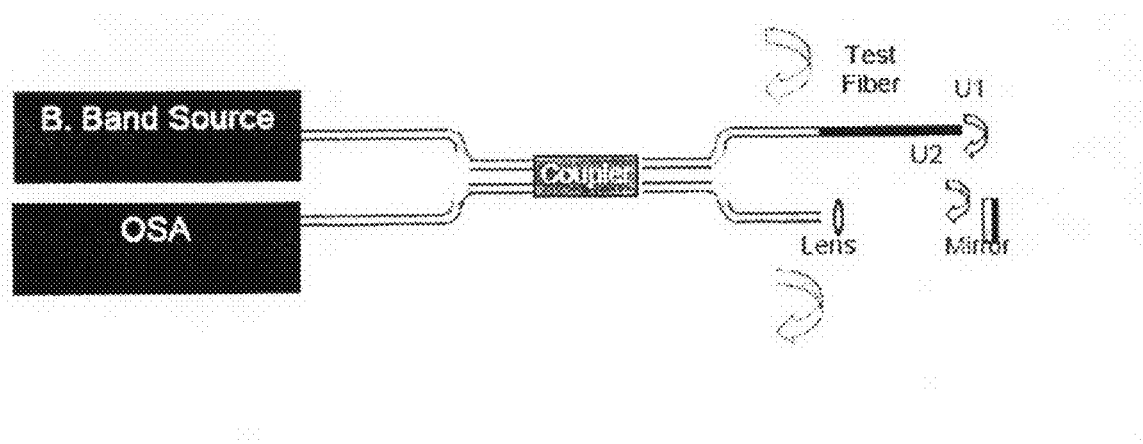
FIG. 1 illustrates the interference caused by coupler arm reflections for a Michelson interferometer.

A Single Arm Interferometer (SAI) can be produced by folding the two arms of a Michelson interferometer (FIG. 1) together into a single path and placing a mirror behind the test fiber. This configuration was designed to eliminate the calibration step required by dual arm interferometers in which the coupler arms are made to be disproportionate in length to eliminate the effect of the extra reflections from the coupler-test fiber/coupler-air path facets. Since calibration is not required this technique is also more accurate than a dual arm interferometer.

1 1 A New Concept

Figure 2:
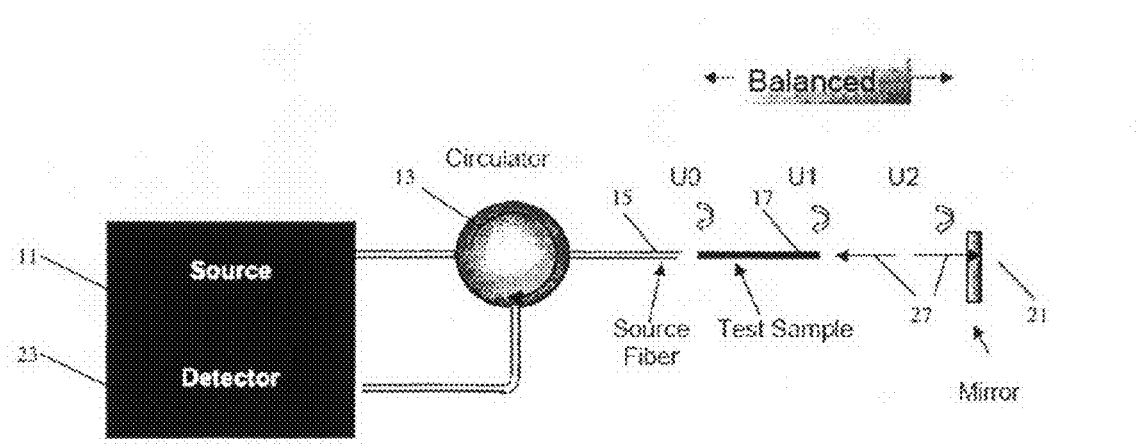
FIG. 2 illustrates a single-arm interferometer that generates a three-wave interferogram.
Figure 11:
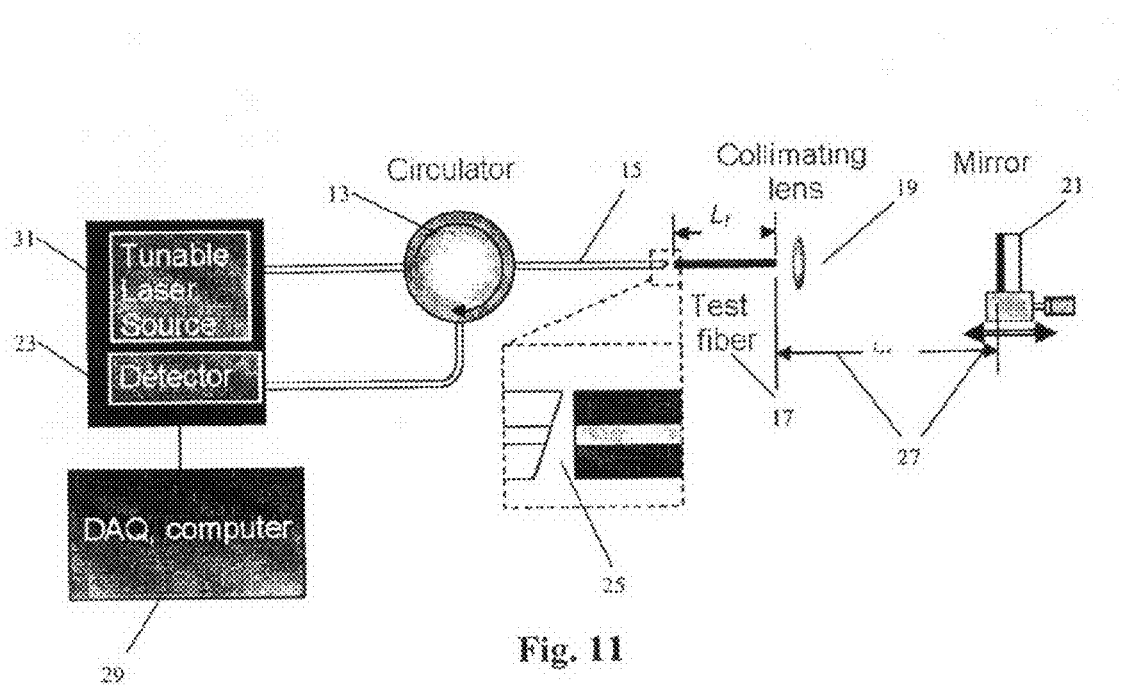
FIG. 11 illustrates a system comprising a single arm interferometer, tunable laser source and detector.

A balanced Single-Arm Interferometer (SAI) can directly measure dispersion in short fibers. A balanced SAI is depicted in FIG. 2. The radiation source (11) ("source") generates an optical signal that enters a device operable to separate the incoming and reflected waves. This device may be a circulator (13), coupler, or other wave-separating means. The optical signal then travels through the launch fiber (15) to the adjacently placed test fiber (17) by way of an angle polished connector (25) that is operable to minimize reflection at the end facet of the launch fiber (15). The optical signal then travels through the test fiber (17) and passes through a collimating means (19) as shown in FIG. 11. Finally, the collimated signal reflects off a mirror (21) and back through the collimating means (19), test fiber (17), launch fiber (15), and wave-separating means. The wave-separating means is operable to direct the reflected optical signal to the detector (23), which records the interference pattern produced by the reflections from the first $U_o$ and second $U_1$ facets of the test fiber (17) and the reflection $U_2$ from the mirror (21).

The SAI system may operate in several different embodiments, the source (11)/detector (23) pairing may be a broadband source operable with an Optical Spectrum Analyzer (OSA) or the source (11)/detector (23) pairing may be a tunable laser (31) operable with a detector (23) system.

The test fiber (17) is a waveguide. As previously mentioned waveguides encompass a large class of materials and include but are not limited to the following: optical fiber, photonic crystal fiber, nanowire, nanofiber, twin-hole fiber and etched waveguides.

This configuration is not only much simpler than a dual arm interferometer but as further evidenced by the experimental setup detailed in FIG. 11, it also minimizes the need for system calibration (assuming the dispersion introduced by the collimating lens (19) is negligible and the air path $L_{air}$ is stable). Its simpler construction also makes it less susceptible to polarization and phase instabilities.

The SAI is a balanced interferometer since the group delay in the test fiber (17) is the same as the group delay in the air path (27). It will be shown mathematically that this balancing of the group delay in each path (17, 27) allows the dispersion parameter to be measured directly from the interference pattern. The conceptual difference between SAI and Dual Arm interferometers is that, in SAI, the interference pattern is produced by three waves: two from the reflections ($U_o$, $U_1$) at the facets of the test fiber (17) and one ($U_2$) from a mirror (21) placed behind it (as shown by $U_o$, $U_1$, and $U_2$ in FIGS. 2 and 3). The beating between the interference fringes produced by the test fiber (17) and those by the air path (27) generates an envelope which is equivalent to the interference pattern produced by two waves ($U_1$ and $U_2$ in FIGS. 2, 3) in a dual-arm interferometer.

From the phase information in this envelope the dispersion parameter can be extracted. Both dual and single arm balanced interferometers have in common this ability to directly measure the dispersion parameter from the interference pattern.

Optionally, the launch fiber (15) may be configured as a polarization controller. This may be accomplished by a number of means known to those skilled in the art, such as looping the launch fiber (15) into three coils. Alternately, the polarization controller may be implemented by placing a linear polarizer in the air path (27). By providing a polarization controller, the SAI may be operable to measure PMD.

The SAI configuration appears similar to common path interferometers, often used for depth imaging as in Common-Path Optical Coherence Tomography (CP-OCT). The SAI, however, is fundamentally different from CP-OCT since it utilizes 3 reflections ($U_o$, $U_1$, and $U_2$), and extracts the dispersion parameter directly from the envelope of the interference pattern. The differences between the Michelson Interferometer, CP-OCT and balanced Single Arm Interferometry are outlined in Table 1.

TABLE 1

Differences & Similarities between the Michelson Interferometer, CP-OCT and the Single Arm Interferometer

| | Balanced Michelson Interferometer | CP-OCT | Balanced SAI |
|---|---|---|---|
| # of interfering waves | 2 | 2 | 3 |
| # of longitudinally separate paths | 2 | 1 | 1 |
| Path balancing | yes | no | yes |
| Dispersion information | entire interferogram | n/a | envelope of interferogram |
| Dispersion parameter measured | directly | n/a | directly |
| Measures | dispersion parameter | optical path length difference | dispersion parameter |

1.2 Mathematical Description
1.2.1.1 Equal Amplitude Case

Figure 3:
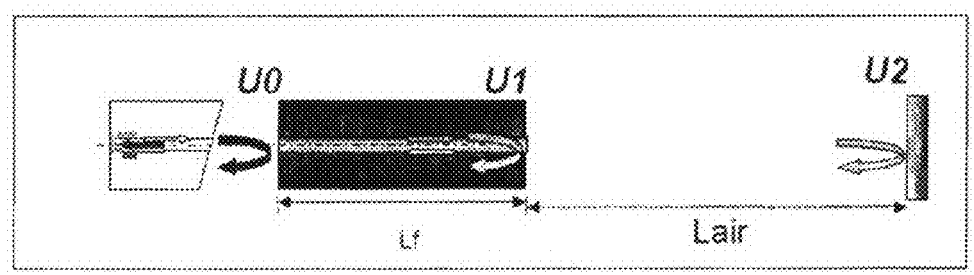
FIG. 3 illustrates the source of three waves comprising an interferogram.

Dispersion measurements can be made using a single-arm interferometer by extracting the second derivative of the effective index with respect to wavelength from the envelope of the interference pattern generated by three waves $U_o$, $U_1$ and $U_2$ depicted in FIGS. 2 and 3.

The extra reflection from the launch fiber (15) is minimized using angle polished connector (25) as shown in FIGS. 2, 3 and further addressed in the experimental set-up found in FIG. 11. The angle polished connector (25) is used at the junction with the test fiber (17). It should be noted that this method is insensitive to the loss introduced by the angle polished connector (25) since the dispersion information is contained within the phase of the three reflected waves ($U_o$, $U_1$, and $U_2$). The optical path length of the air path $L_{air}$ is made to cancel out the strong linear effective group index term of the test fiber (17) at a central wavelength, $\lambda_o$. The amplitudes of $U_o$ and $U_1$ are assumed to be equal to the magnitude of the reflection at the test fiber (17) end facets. The amplitude of $U_2$ depends on the amount of light coupled back to the test fiber (17). This coupling efficiency can be adjusted by varying the alignment of the mirror (21) such that $U_2$ has the same amplitude as $U_o$ and $U_1$. In this simplified presentation:

$$U_1 = U_0 e^{-j2\beta L_f}$$

$$U_2 = U_0 e^{-j2\beta L_f - j2k_0 L_{air}} \quad \text{Eq. 10}$$

In Eq. 10, $L_f$ and $L_{air}$ are the lengths of the test fiber (17) and the air path (27), respectively. $\beta$ and $k_o$ are the propagation constant of the fundamental mode in the fiber and the propagation constant in free space. The interference pattern is produced by the interference of the three reflections ($U_o$, $U_1$, and $U_2$) is given by Eq. 11:

$$I_o = |U_0 + U_1 + U_2|^2 \quad \text{Eq. 11}$$
$$= U_o^2 \left( \begin{array}{c} 3 + 2\cos(2\beta L_f + 2k_o L_{air}) + \\ 4\cos(\beta L_f + k_o L_{air})\cos(\beta L_f - k_o L_{air}) \end{array} \right)$$

Eq. 11 contains two fast terms, with a phase $\phi_1 = +(\beta L_f + k_o L_{air})$ and $\phi_2 = 2(\beta L_f + k_o L_{air})$. Since $\phi_1$ is slower than $\phi_2$ it will amplitude modulate the faster term. As a result the period of the 'carrier' will be that of the slowest of the fast terms, $\phi_{carrier} = \phi_1$. This carrier is then itself amplitude modulated by the slower term $\phi_{envelope} = (\beta L_f - k_o L_{air})$ to produce the 'envelope' of the interference pattern. This envelope is equivalent to the interference pattern produced by Michelson interferometer and it can be written as:

$$U_o^2 (5 + 4|\cos(\phi_{envelope})|) \quad \text{Eq. 12}$$

Figure 4:
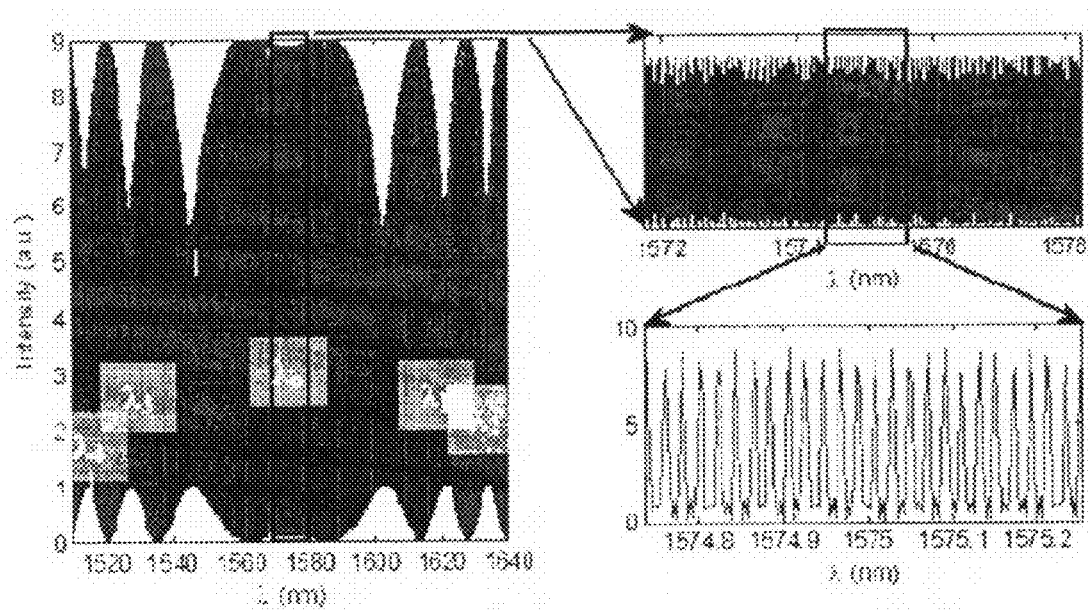
FIG. 4 illustrates an example of an interferogram produced from three interfering waves using an example fibre.

The calculated interference pattern generated by the setup for a 39.5 cm SMF28™ test fiber is illustrated in FIG. 4. It depicts the envelope function which is a close approximation of the envelope of the actual envelope of the carrier.

Applying a Taylor expansion to the phase of the slow envelope and replacing $\beta$ with $2\pi n_{eff}/\lambda$, where $n_{eff}$ is the effective index of the fiber, gives the phase relation in Eq. 13:

$$\phi_{envelope}(\lambda) = \quad \text{Eq. 13}$$
$$2\pi \left\{ \begin{array}{l} \frac{1}{\lambda}\left[\left(n_{eff}(\lambda_o) - \lambda_o \frac{dn_{eff}}{d\lambda}\bigg|_{\lambda_o}\right)L_f - L_{air}\right] + L_f \frac{dn_{eff}}{d\lambda}\bigg|_{\lambda_o} + \\ L_f \frac{(\lambda - \lambda_o)^2}{2!\lambda} \frac{d^2 n_{eff}}{d\lambda^2}\bigg|_{\lambda_o} + L_f \frac{(\lambda - \lambda_o)^3}{3!\lambda} \frac{d^3 n_{eff}}{d\lambda^3}\bigg|_{\lambda_o} + ... \end{array} \right\}$$

The first term in Eq. 13 (in the square brackets) disappears when $L_{air}$ is adjusted to balance out the group delay of the test fiber (17) at $\lambda_o$, the balanced wavelength. Taking the difference between the phases at two separate wavelengths; $\lambda_1$ and $\lambda_2$ results in:

$$\Delta\phi_{envelope} = |\phi_{envelope}(\lambda_2) - \phi_{envelope}(\lambda_1)| \quad \text{Eq. 14}$$

$$= 2\pi \left( \begin{bmatrix} \frac{(\lambda_2-\lambda_0)^2}{2!\lambda_2} - \frac{(\lambda_1-\lambda_0)^2}{2!\lambda_1} \end{bmatrix} \frac{d^2 n_{eff}}{d\lambda^2}\bigg|_{\lambda_0} + \\ \begin{bmatrix} \frac{(\lambda_2-\lambda_0)^3}{3!\lambda_2} - \frac{(\lambda_1-\lambda_0)^3}{3!\lambda_1} \end{bmatrix} \frac{d^3 n_{eff}}{d\lambda^3}\bigg|_{\lambda_0} \right) L_f$$

$$= m\pi$$

Note that m is the number of fringes between the two wavelengths. If this phase difference is taken using a different pair of peaks/troughs (i.e. $\lambda_3$ & $\lambda_4$) the result is a system of equations in which $d^2 n_{eff}/d\lambda^2|_{\lambda_o}$ and $d^3 n_{eff}/d\lambda^3|_{\lambda_o}$ can be solved directly. Since the troughs in the interference pattern are more sharply defined it is more accurate to choose the wavelength locations of the troughs of the envelope as the wavelengths used in Eq. 14.

Note that, if the third-order dispersion is ignored, then only two wavelengths (e.g. $\lambda_1$ and $\lambda_2$) are required to calculate the second-order dispersion. This, however, would be less accurate. The dispersion parameter D can then be found as follows:

$$D(\lambda_o) = -\frac{\lambda_o}{c} \frac{d^2 n_{eff}}{d\lambda^2}\bigg|_{\lambda_o} \quad \text{Eq. 15}$$

1.2.1.2 Unequal Amplitude Cases

In reality the reflections ($U_o$, $U_1$, and $U_2$) from the three facets of the interferometer as illustrated in FIGS. 2 and 3 do not have equal magnitudes. As a result the interference pattern produced by these reflections ($U_o$, $U_1$, and $U_2$) is not as simple as presented in the previous section. It is shown that despite this fact the previous results still hold since the locations of the troughs of the envelope, which are used to obtain the dispersion information, remain the same even though the fringe contrast varies.

In general the reflections from each facet ($U_o$, $U_1$) of the test fiber (17) and the reflection from the mirror ($U_2$) shown in FIG. 3, do not have the same magnitude. The magnitudes of the reflections in terms of the first reflection ($U_o$) can be expressed as follows:

$$U_1 = a U_0 e^{-j2\beta L_f}$$

$$U_2 = b U_0 e^{-j2\beta L_f - j2k_0 L_{air}} \quad \text{Eq. 16}$$

In Eq. 16 $L_f$ and $L_{air}$ are the lengths of the test fiber (17) and the air path (27), respectively. $\beta$ and $k_o$ are the propagation constant of the fundamental mode in the fiber and the propagation constant in free space. 'a' is the fraction of the amplitude reflected from the second facet in terms of the first and 'b' is the fraction of the amplitude reflected from the mirror (21) in terms of the fraction reflected from the first facet. The interference pattern of the spectral interferogram can be expressed as:

$$I_o = |U_0 + U_1 + U_2|^2 \quad \text{Eq. 17}$$

$$= U_o^2 \left\{ \begin{array}{l} 1 + a^2 + b^2 + 4a\cos(\beta L_f + k_o L_{air})\cos(\beta L_f - k_o L_{air}) + \\ 2a(b-1)\cos(2k_o L_{air}) + 2b\cos(2(\beta L_f + k_o L_{air})) \end{array} \right\}$$

The expression in Eq. 17 can be treated as a fast-varying "carrier" (with respect to frequency or wavelength) modified by an upper and a lower slow-varying envelope, as shown in FIG. 4, which depicts the simulated spectral interferogram generated by the 3-wave SAI with a 39.5-cm SMF28 fiber as the test fiber. Upon closer examination (FIG. 4, lower right), the "carrier" is not a pure sinusoidal function, because there are three fast-varying phases in Eq. 17, $2(\beta L_f + k_o L_{air})$, $(\beta L_f + k_o L_{air})$, and $2k_o L_{air}$, all of which vary much faster than the phase of the envelope ($\phi_{envelope}$), which equals $\beta L_f - k_o L_{air}$. When b is large (>0.5), it can be shown that the upper envelope is approximated by $$U_o^2(1 + a^2 + b^2 + 2a(b-1) + 2b + 4a|\cos(\phi_{envelope})|) \quad \text{Eq. 18}$$

It will now be shown that although the magnitude of the interference pattern is not the same as the envelope for cases in which b≠1, the peak and trough locations of the two match exactly. As a result the phase information of the interferogram is preserved and the dispersion information can be extracted from the interferogram. Note that a=b=1 is a special case of this more general analysis and was presented in the previous section.

Since the phase of the upper envelope, $\phi_{envelope}$ (and therefore the dispersion information) is unaffected by the magnitude of the reflections from the facets ($U_o$, $U_1$) and the mirror ($U_2$), the method for determining the dispersion parameter as presented in Eqs. 13 to 15 is valid even in the general case. The dispersion parameter, therefore, can always be obtained from an SAI.

As mentioned earlier, the main difference between the fringes produced in the SAI and those produced by dual arm interferometers is the presence of a fast carrier (Eq. 17) slowly modulated by the desired envelope. The presence of this carrier sets extra operational constraints that will be discussed in the next section.

1.3 System Parameters

There may be four factors of interest with regard to the dispersion measurement of the present invention. These factors may determine the quality and range of the output of the dispersion measurements. The first factor of interest is the wavelength resolution of the measurement, the second is the minimum required bandwidth of the source, the third is the measurable bandwidth of the dispersion curve, and the fourth is the test fiber length. The sections that follow discuss how each of these factors affect the output of the dispersion measurement.

1.3.1 Wavelength Resolution of the Dispersion Measurement

The wavelength resolution of the points in the plot of the dispersion parameter is determined by the minimum step size of the translation stage. With smaller step increments in the translation stage there are smaller step increments in the plot of the dispersion parameter vs. wavelength. This is because variation of the air path (27) changes the wavelength where the air path (27) and test fiber (17) are balanced and produces a new interferogram from which the dispersion parameter can be determined. Examination of Eq. 13 shows that the first term can be removed if the group delay in the air path (27) is equal to that in the test fiber path for the central wavelength, $\lambda_o$ (central wavelength at which the group delay in test fiber (17) and air paths (27) are balanced). The relationship between the air path length ($L_{air}$) and the fiber length ($L_f$) at the wavelength $\lambda_o$ is given by Eq. 19:

$$L_{air} = \left( n_{eff}(\lambda_o) - \lambda_o \frac{d n_{eff}}{d\lambda}\bigg|_{\lambda_o} \right) L_f \quad \text{Eq. 19}$$

Taking the derivative of $L_{air}$ with respect to $\lambda_o$ and using the definition given by Eq. 15:

$$\frac{dL_{air}}{d\lambda}\bigg|_{\lambda_o} = \left(-\lambda_o \frac{d^2 n_{eff}}{d\lambda^2}\bigg|_{\lambda_o}\right) L_f = cD(\lambda_o) L_f \quad \text{Eq. 20}$$

Therefore the change of $\lambda_o$ with respect to the change of $L_{air}$ can be written as $$\frac{d\lambda_o}{dL_{air}} = \frac{1}{cL_f D} \quad \text{Eq. 21}$$

Thus, the relationship between a change in the central (balanced) wavelength and the change in the air path length ($L_{air}$) is given by:

$$d\lambda_o = dL_{air} \frac{1}{cL_f D} \quad \text{Eq. 22}$$

The minimum amount by which the air path (27) can change sets the minimum increment of the central wavelength in the interferogram. This amount must be several times smaller than the bandwidth of the source. Thus the minimum step size of the air path (27) sets the wavelength resolution of the measured dispersion curve. Note the wavelength resolution is also inversely proportional to the dispersion-length product of the test fiber (17).

The dependence of the wavelength resolution on the dispersion length product will now be shown. As a numerical example, for a step size of 0.1 μm, assuming a 50-cm-long SMF28™ test fiber, the wavelength resolution is 0.1 nm, which is sufficient for most applications. As a graphical example the wavelength resolution is plotted against the dispersion-length product of standard SMF28™ fiber.

1.3.2 Minimum Required Source Bandwidth

A minimum number of envelope fringes are required for accurate measurements of dispersion. As long as the balanced wavelength, $\lambda_0$, and four other wavelengths corresponding to the peaks (or troughs) of the envelope fringes are captured within the source bandwidth, $B_{source}$, (FIG. 5), it is sufficient to determine dispersion $D(\lambda_0)$. It is found in practice that more accurate measurements require selecting two peaks (or troughs) on either side of $\lambda_0$, as indicated by $B_{min}$ on FIG. 5.

Figure 5:
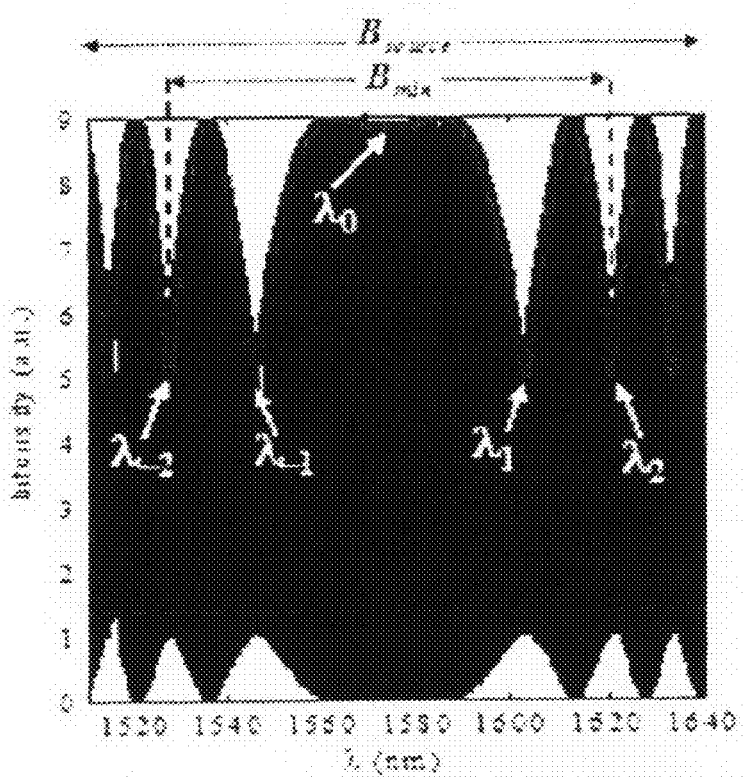
FIG. 5 illustrates the minimum required source bandwidth and the locations of the troughs required to extract dispersion information from an interferogram.

For a given test fiber, the dispersion-length product is fixed. Therefore, the only factor that limits the number of envelope fringes is the source bandwidth, $B_{source}$. The longer the test fiber (17), or the larger the dispersion, the more closely spaced the envelope fringes, and hence the smaller the required bandwidth. In order to determine $B_{min}$ quantitatively, it is required to determine the maximum value for the wavelength spacing ($\lambda_2 - \lambda_0$), as shown in FIG. 5. From Eq. 13, ignoring the $3^{rd}$-order term, envelope phase difference $|\phi_{envelope}(\lambda_1) - \phi_{envelope}(\lambda_0)|$, which has an upper bound of $\pi$, since the first trough occurs at $\lambda_1$ can be obtained:

$$|\phi_{envelope}(\lambda_1) - \phi_{envelope}(\lambda_0)| = 2\pi \frac{(\lambda_1 - \lambda_0)^2}{2!\lambda_1} \frac{d^2 n_{eff}}{d\lambda^2}\bigg|_{\lambda_0} L_f \leq \pi \quad \text{Eq. 23}$$

Applying the definition of dispersion in Eq. 15, the upper bound of the wavelength spacing ($\lambda_1 - \lambda_0$) is:

$$\lambda_1 - \lambda_0 \leq \frac{\lambda_0}{\sqrt{cDL_f}} \quad \text{Eq. 24}$$

Next, the wavelength spacing between $\lambda_1$ and $\lambda_2$ is examined. From 4-5, ignoring the $3^{rd}$-order term and applying Eq. 15 gives:

$$(\lambda_2 - \lambda_0)^2 - (\lambda_1 - \lambda_0)^2 \approx \frac{\lambda_o^2}{cDL_f} \quad \text{Eq. 25}$$

Combining Eqs. 24 and 25, the upper bound for the wavelength spacing $\lambda_2 - \lambda_0$ is:

$$(\lambda_2 - \lambda_0)^2 = [(\lambda_2 - \lambda_1) + (\lambda_1 - \lambda_0)]^2 \leq \frac{2\lambda_o^2}{cDL_f} \quad \text{Eq. 26}$$

The minimum required source bandwidth $B_{min}$ should be not less than the upper bound of $2(\lambda_2 - \lambda_0)$, therefore, $$B_{min} = 2\sqrt{2} \frac{\lambda_0}{\sqrt{cDL_f}} \quad \text{Eq. 27}$$

It is clear that the dispersion-length product of the test fiber (17) also affects the minimum required bandwidth. Using a similar numerical example, assuming a 50-cm-long SMF test fiber and 1550 nm as the balanced wavelength, the minimum required bandwidth is 85 nm.

1.3.3 Measurable Bandwidth of the Dispersion Curve $B_{mea}$

Since each spectral interferogram produces one dispersion value at the balanced wavelength, $\lambda_0$, to obtain dispersion versus wavelength, a number of interferograms are recorded at various balanced wavelengths by setting the appropriate air path lengths (27). Since each interferogram should be taken over a bandwidth of at least $B_{min}$, from FIG. 5 one can see that the measurable bandwidth of the dispersion curve is the difference between the available source bandwidth $B_{source}$ and the minimum required bandwidth $B_{min}$, that is, $$B_{mea} = B_{source} - B_{min} \geq B_{source} - 2\sqrt{2} \frac{\lambda_0}{\sqrt{cDL_f}} \quad \text{Eq. 28}$$

Alternatively, if two of the troughs are not required to be on each side of 4, then the measurable bandwidth $B_{mea}$ can be larger. In order to accurately determine $\lambda_0$, the central fringe (from $\lambda_{-1}$ to $\lambda_1$ in FIG. 5) is required to be entirely visible within the measured spectral range. Therefore, $$B_{mea} = B_{source} - 2(\lambda_1 - \lambda_0) \geq B_{source} - 2\frac{\lambda_0}{\sqrt{cDL_f}} \quad \text{Eq. 29}$$

Either equation Eq. 28 or 29 give the lower bound for the measurable bandwidth, which assumes the widest possible central fringe. In practice, since $\phi_{envelope}(\lambda_0)$ cannot be controlled, the width of the central fringe can be anywhere between zero and twice the limit of Eq. 29. Therefore, $B_{mea}$ can be as large as $B_{source}$ in certain cases.

Examination of Eq. 28 or 29 shows that increasing the dispersion-length product of the test fiber (17) increases $B_{mea}$. Note that for a given measurement system, $B_{source}$ is fixed, so the only parameter that can be used to extend $B_{mea}$ is $L_f$. The dispersion length product is, in fact, the main independent variable in determining the system parameters.

The dispersion length-product has been shown to be the main independent variable in determining the measurable bandwidth and the minimum bandwidth. But the range of this parameter is itself affected by the source used. The bandwidth of the source determines the minimum fiber length that can be characterized using this technique and the minimum wavelength step of the source leads to a maximum characterizable fiber length. The next section discusses how the source bandwidth and minimum wavelength step size affect the range of fiber lengths that can be measured using the SAI technique.

1.3.4 Minimum Fiber Length

The bandwidth of the source determines the minimum fiber length that can be characterized using SAI. A smaller fiber length produces a wider spectral interferogram as determined by Eq. 27. Thus in order for a certain fiber length to be characterizable using SAI the interferogram produced must fit inside the source bandwidth. Therefore the requirement is that, $$B_{min} \leq B_{source} \qquad \text{Eq. 30}$$

Using Eq. 27:

$$L_f \geq \frac{8\lambda_o^2}{cDB_{source}^2} \qquad \text{Eq. 31}$$

Figure 6:
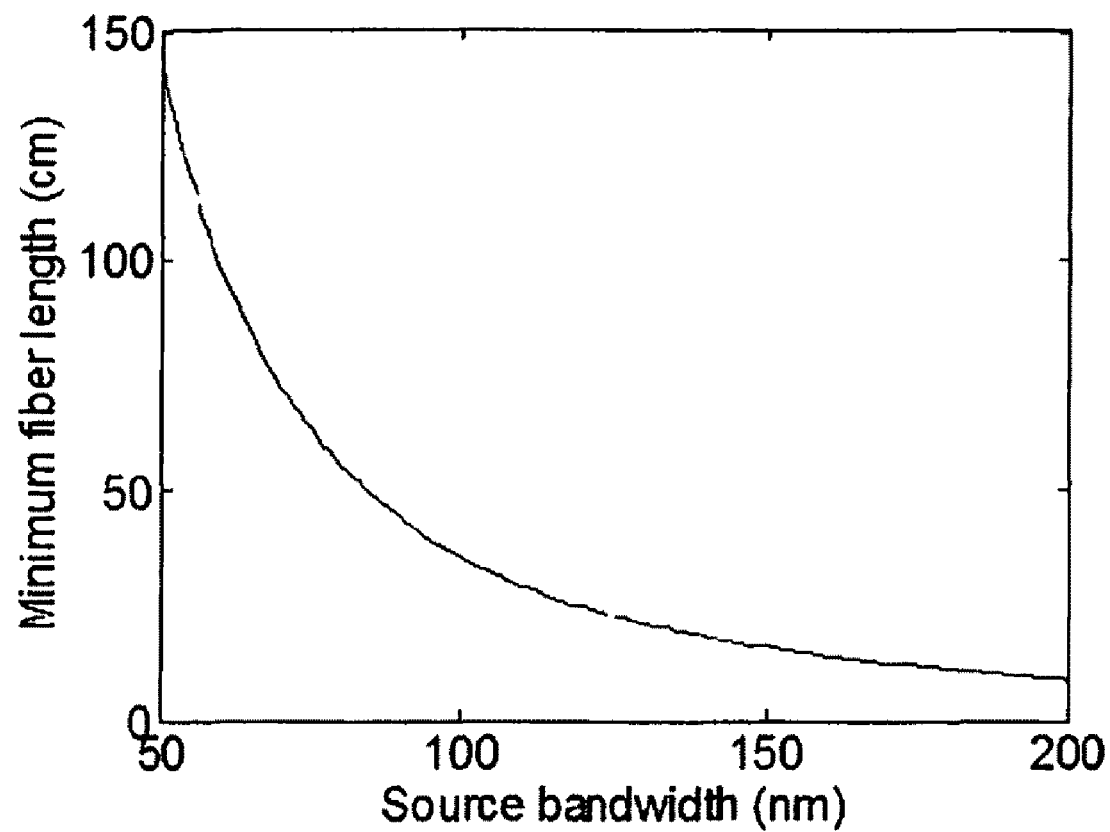
FIG. 6 illustrates the minimum fibre length required to extract dispersion information for a given source bandwidth.

Note that for a longer fiber there will be a greater measurement bandwidth (according to Eq. 28 or 29) and a higher wavelength resolution (Eq. 22). As a numerical example, for a source bandwidth of 130 nm, the minimum length for a SMF28 fiber is 0.23 m. The minimum fiber length is plotted as a function of the source bandwidth in FIG. 6.

1.3.5 Maximum Fiber Length

The SAI method uses the slow-varying envelope function to obtain dispersion. Though the "carrier" fringes are not of interest, they still need to be resolved during measurement otherwise the envelope shape cannot be preserved. The carrier fringe spacing is directly affected by the length of the fiber under test, $L_f$. A longer fiber will lead to narrower carrier fringes.

The minimum step size of the tunable laser, however, sets a limit on the minimum carrier fringe period that can be detected due to aliasing. Since a longer fiber length has a higher frequency carrier this minimum detectable fringe period results in a limit on the maximum fiber length. The carrier fringe period is the wavelength difference that causes the fast varying phase to shift by $2\pi$. The Fast phase term in Eq. 11 for a balanced air path, $L_{air}=N_g(\lambda_o)L_f$, can be written as:

$$\phi = (k_o n_{eff} L_f + k_o N_g(\lambda_o) L_f) \qquad \text{Eq. 32}$$

Using a first order approximation of $n_{eff}$ and $N_g$ $$N_g(\lambda_o) \approx n_{eff} \approx n \qquad \text{Eq. 33}$$

Where n is the core index, the phase term is written as $$\phi = \frac{4\pi n L_f}{\lambda_o} \qquad \text{Eq. 34}$$

The fringe period, $\Delta\lambda$, corresponds to a $2\pi$ phase shift $$\Delta\phi = \frac{4\pi n L_f}{\lambda_o^2} \Delta\lambda = 2\pi \qquad \text{Eq. 35}$$

Hence, $$\Delta\lambda = \frac{\lambda_o^2}{2nL_f} \qquad \text{Eq. 36}$$

In order to detect one fringe accurately, the Nyquist criterion is applied where at least 2 sample points have to be included in one fringe. This sets the following limit over the fiber length:

$$L_f \leq \frac{\lambda_o^2}{4n\Delta\lambda} \qquad \text{Eq. 37}$$

where $\Delta\lambda$ is the minimum wavelength step size of the tunable laser.

If the fiber length limit is exceeded aliasing occurs.

The preceding analysis assumes that it is necessary to avoid aliasing to ensure that all of the peaks of the interferogram are sampled in order to accurately plot the envelope of the interferogram. It is this assumption that leads to the upper limit in the fiber length given in Eq. 37. This upper limit however can be exceeded by dividing the interferogram into small window sections and selecting a single point in each window to plot the envelope. The theory behind this technique, called wavelength windowing, will be explained in detail in the next section.

1.4 The Effect of Wavelength Windowing

The problem with trying to measure a fiber longer than Eq. 37 allows is that the period of the carrier gets shorter with increasing fiber length. According to Nyquist theory the sampling period, determined by the average step size of the tunable laser, must be at least 2 times smaller than the period of the carrier in order to avoid aliasing. This ensures that all the sampled peaks of the carrier match the true envelope of the interference pattern.

Figure 7:
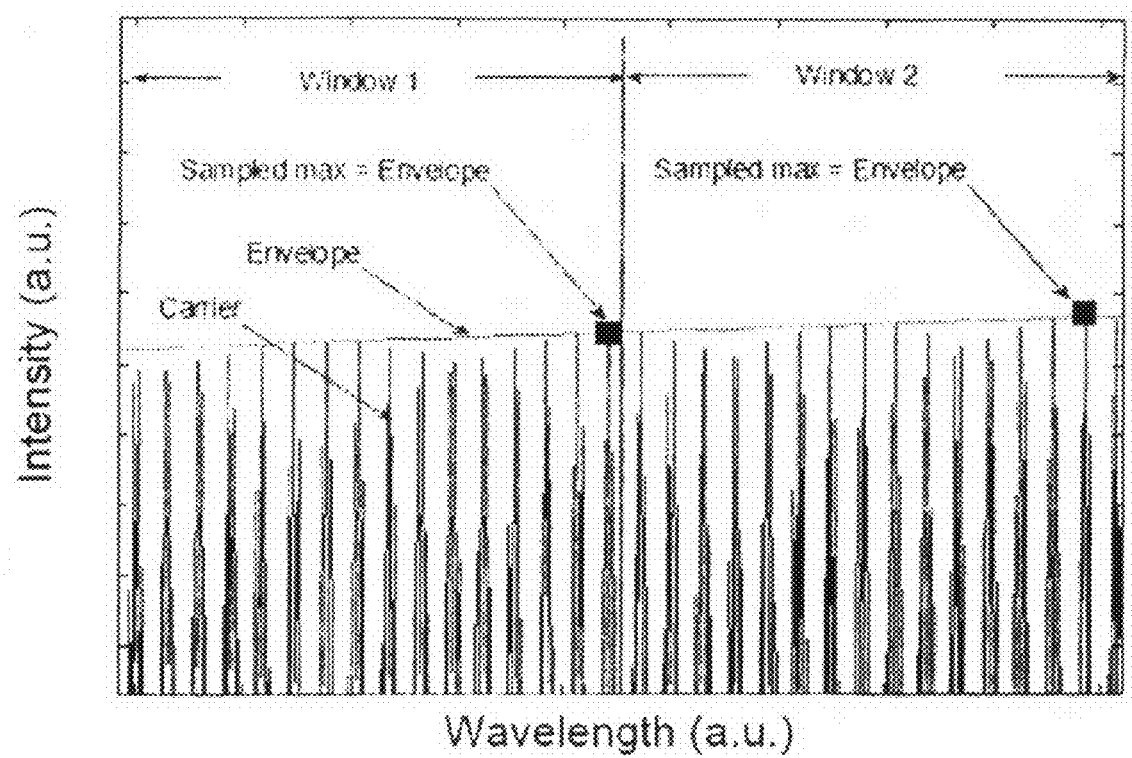
FIG. 7 illustrates the method of wavelength windowing.

Aliasing is a phenomenon that prevents every peak of the carrier from being sampled but it does not mean that some of the peaks in a given wavelength window range will not be sampled. The interferogram can be divided into small window sections, as shown in FIG. 7, each containing many sampled points. Thus when aliasing does occur there will be a certain probability that at least one of the sampling points will land on a peak of the interferogram within each wavelength window (assuming a slow variation in the envelope within that window). Therefore, the envelope of the interferogram can be plotted under conditions where aliasing does occur by taking the maximum in each wavelength window and connecting them together, as shown in FIG. 7.

Detailed statistical analysis (developed in the next section) shows how the probability that at least one of the peaks will be sampled within a wavelength window is determined. This technique shows that the upper limit in Eq. 37 can be exceeded by many folds by wavelength windowing.

1.5 Model Development

Figure 8:
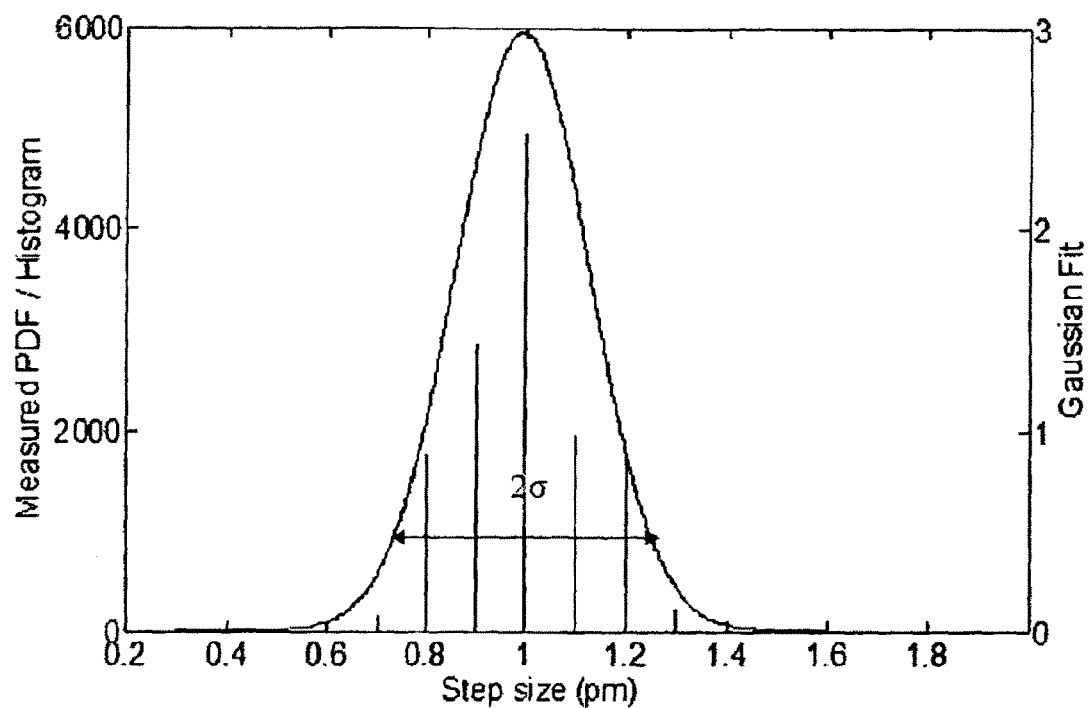
FIG. 8 illustrates the measured probability density function and a Gaussian fit for the step size of an example tunable laser.

This technique uses a tunable laser (31) system to sample the peaks of an interferogram. A real world tunable laser (31) system, however, does not step the wavelength with equal step sizes but has a certain standard deviation in its step size. In order to produce an accurate modeling of a real world process this variation in the step size of the tunable laser (31) must be taken into account by the model. The tunable laser (31) system used in the experiments was the Agilent 8164A™ which has an average step size of 1 pm and a standard deviation of 0.17 pm as determined from the histogram and the Gaussian probability density function (PDF) in FIG. 8.

In order for the model to accurately determine the probability of a sampled point matching at least one peak of the carrier wave within a certain wavelength window, certain parameters must be determined. The model that will be developed requires knowledge of the fiber length, the width of wavelength window, the average step size of the tunable laser, the standard deviation of this step size and the tolerance in detecting the peak as a percentage of the carrier period.

Figure 9:
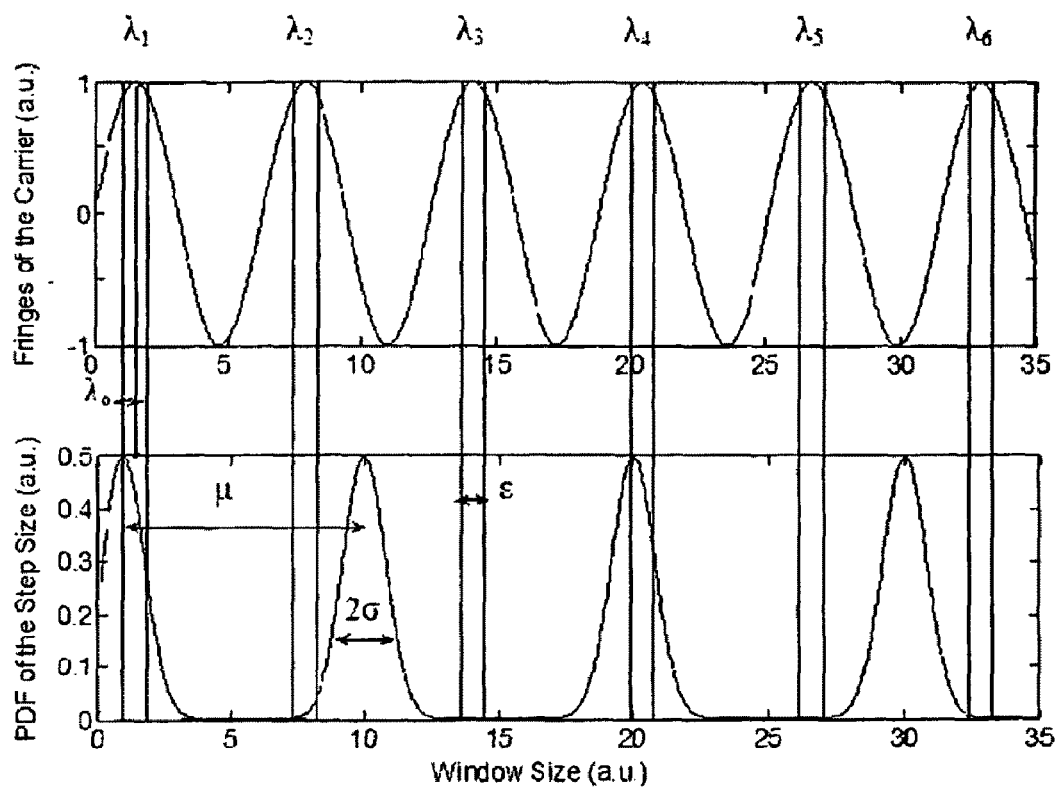
FIG. 9 illustrates the probability density functions for the step size and the carrier for determining the probability of hitting a peak in a given wavelength window.

In this model the fiber length as $L_f$, the wavelength window within which it is desired to detect a peak as W, the average step size of the tunable laser as $\mu$, the standard deviation of the step size of the tunable laser as $\sigma$ and the tolerance in detecting the peak as a percentage of the carrier period as $\epsilon$ can be designated. If $\lambda_o$ is the separation between the first carrier peak and the maximum sampling probability density of the first step, as shown in FIG. 9, then the wavelength location of the next maximum sampling probability occurs at $\lambda_o+\mu$ and the following one occurs at $\lambda_o+2\mu$ and so on. FIG. 9 illustrates the probability density functions along with the carrier functions.

FIG. 9 also illustrates the fact that even with aliasing, where all the peaks of the interferogram are not sampled, there is still a chance that at least one of the peaks of the interferogram will be sampled for a given wavelength window since the period of the peaks of the carrier is different than the period of the wavelength steps of the tunable laser. Thus, for any given window size there will be a number of peaks of the carrier.

Assuming the location of the first carrier peak to be at $\lambda_1$, as shown in FIG. 9, then the probability that this first peak is sampled by the first step of the tunable laser is given by:

$$P_{11} = \int_{\lambda_1-\frac{\epsilon}{2}}^{\lambda_1+\frac{\epsilon}{2}} \frac{1}{\sqrt{2\pi}\,\sigma} e^{\left(-\frac{(\lambda-\lambda_o)^2}{2\sigma^2}\right)} d\lambda \quad \text{Eq. 38}$$

Therefore the probability that the first peak is sampled by the first step is:

$$\overline{P_{11}} = 1 - P_{11} = 1 - \int_{\lambda_1-\frac{\epsilon}{2}}^{\lambda_1+\frac{\epsilon}{2}} \frac{1}{\sqrt{2\pi}\,\sigma} e^{\left(-\frac{(\lambda-\lambda_o)^2}{2\sigma^2}\right)} d\lambda \quad \text{Eq. 39}$$

Here $\epsilon$, shown in FIG. 9, is a fraction of the width of the carrier period and this measure translates into a tolerance in the measurement of the peak amplitude.

If N is the number of steps of the tunable laser in a given window size then the probability of not sampling the first peak with any of the N steps is given by:

$$\overline{P_N} = \overline{P_{11}P_{12}}\ldots\overline{P_{1N}} \quad \text{Eq. 40}$$

$$= \prod_{n=1}^{N}\left[1 - \frac{1}{\sqrt{2\pi}\,\sigma}\int_{\lambda_1-\frac{\epsilon}{2}}^{\lambda_1+\frac{\epsilon}{2}} \frac{1}{\sqrt{2\pi}\,\sigma} e^{\left(-\frac{(\lambda-(\lambda_o+n\mu))^2}{2\sigma^2}\right)} d\lambda\right]$$

If M is the number of peaks of the carrier in a given window size then the probability of not sampling any of the M peaks with any of the N steps is given by:

$$\overline{P_{NM}} = \prod \overline{P_{nm}} \quad \text{Eq. 41}$$

$$= \prod_{m=1}^{M}\prod_{n=1}^{N}\left[1 - \frac{1}{\sqrt{2\pi}\,\sigma}\int_{\lambda_m-\frac{\epsilon}{2}}^{\lambda_m+\frac{\epsilon}{2}} \frac{1}{\sqrt{2\pi}\,\sigma} e^{\left(-\frac{(\lambda-(\lambda_o+n\mu))^2}{2\sigma^2}\right)} d\lambda\right]$$

$$= \prod_{m=1}^{M}\prod_{n=1}^{N}\left[1 - \frac{1}{2}[\text{erf}(\Lambda_+) - \text{erf}(\Lambda_-)]\right]$$

Where $\lambda_m$ is the location of the $m^{th}$ peak in the wavelength window and is given by m $k_i$ and $\Lambda_+$ and $\Lambda_-$ are the normalized wavelength parameters given by:

$$\Lambda_{m\pm} \equiv \frac{\left(\lambda_m \pm \frac{\epsilon}{2}\right) - (\lambda_o + n\mu)}{\sqrt{2}\,\sigma} \quad \text{Eq. 42}$$

Since the model assumes a fixed relationship between the first carrier peak and the maximum of the probability density function this probability should be averaged for $\lambda_o$ varying over one carrier wave period. This gives the probability that no carrier peak is sampled in a given window for a random alignment between the carrier peaks and the maximum of the probability density function. The result is given as:

$$\langle\overline{P_{NM}}\rangle = \left\langle\prod_{m=1}^{M}\prod_{n=1}^{N}\left[1 - \frac{1}{2}[\text{erf}(\Lambda_+) - \text{erf}(\Lambda_-)]\right]\right\rangle \quad \text{Eq. 43}$$

Thus the probability that at least one of the peaks is sampled for a given window size is determined as:

$$\langle P\rangle = 1 - \left\langle\prod_{m=1}^{M}\prod_{n=1}^{N}\left[1 - \frac{1}{2}[\text{erf}(\Lambda_+) - \text{erf}(\Lambda_-)]\right]\right\rangle \quad \text{Eq. 44}$$

1.6 Simulation Results 1.6.1 Probability vs. Fiber Length

Figure 10:
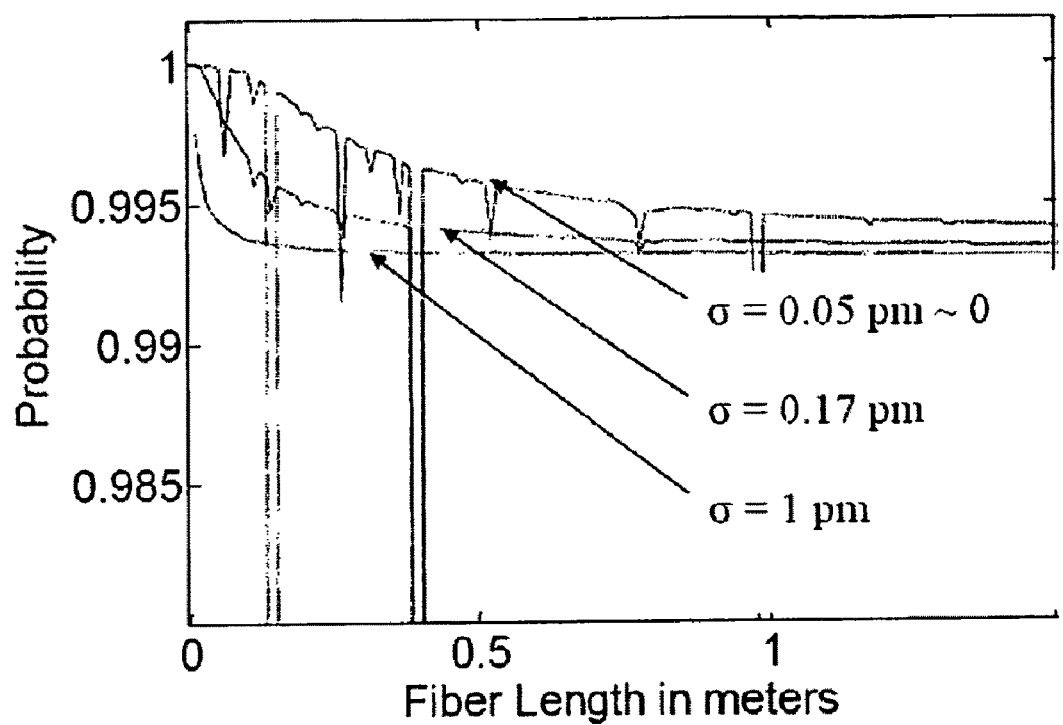
FIG. 10 illustrates the relationship between the probability that at least one peak is sampled in a given window and fibre length.

The probability that at least one peak is sampled in a given window size, W, is shown in FIG. 10 as a function of the fiber length, $L_f$. The parameters held constant for this simulation are the average step size of the tunable laser (31) ($\mu=1$ pm), the window size (W=0.25 nm) and the tolerance ($\epsilon=0.02\times$ average carrier period). The probability is plotted for 3 different cases of the standard deviation in FIG. 10: $\sigma=0.05$ pm, which is as close as possible to the $\sigma=0$ case (i.e. constant step size case) using the model since $\sigma=0$ leads to a $\Lambda_{m+}=1/0$ (undefined) in Eq. 42, $\sigma=0.17$ pm and $\sigma=1$ pm.

FIG. 10 shows some peculiar dips where the probability drops to zero for the cases where the standard deviation is small (σ=0.05 pm and σ=0.17 pm). When the standard deviation is high (σ=1 pm) these dips disappear. FIG. 10 also shows that for higher standard deviation the probability curves drop more quickly to the asymptotic value. Thus a lower standard deviation in the step size of the tunable laser (31) produces curves with higher initial probabilities, but large dips in the probability curve where the probability drops to zero. A higher standard deviation in the step size produces curves with lower initial probabilities but eliminates the dips where the probability drops to zero. It is therefore beneficial to have some amount of variation in the step size of the tunable laser (31) in order to eliminate these dips in the probability.

2: Experimental Results 2.1 Experimental Process

The first step in the experiment is to set up the Single Arm Interferometer and to assemble the control and data acquisition hardware (29). The second step in the experiment is to test the technique by using it to measure the dispersion of test fibers (17) for which the dispersion curves are known or that can easily be measured using conventional techniques. To do this, the dispersion curves of Single Mode Fiber (SMF28™) and Dispersion Compensating Fiber (DCF) were measured. After careful analysis of the results for the experiments on SMF28™ and DCF the new technique was then used to measure the dispersion of a test fiber (17) that has never before been characterized (twin-hole fiber). The entire experimental process for this project is outlined in FIG. 11.

2. 2 Experimental Instrumentation & Specific Limits

The experimental set up is shown in FIG. 11. The tunable laser source (41) and detector (23) used are plug-in modules of the Agilent 8164A Lightwave Measurement System™. The tunable laser source (41) has a bandwidth of 130 nm centered around 1550 nm, and a minimum average wavelength step of 1 pm (standard deviation σ=0.17 pm). The unit records the detector (23) readings and the wavelength readings as the tunable laser source (41) wavelength is swept. The spectral interference pattern is then analyzed. An angle-polished connector (25) is used at the launch fiber (15) as shown in FIG. 11 in order to eliminate the reflection from this facet. The reflections from the collimating lens (19) surfaces are suppressed by using an antireflection coated lens. The dispersion of the lens (19) is negligible. The mirror (21) tilt is adjusted to obtain maximum fringe visibility. The mirror (21) translation is controlled manually, and the minimum step is approximately 5 μm.

Optionally, the launch fiber (15) may be configured as a polarization controller. This may be accomplished by a number of means known to those skilled in the art, such as looping the launch fiber (15) into three coils. Alternately, the polarization controller may be implemented by placing a linear polarizer in the air path (27). By providing a polarization controller, the SAI may be operable to measure polarization mode dispersion.

2. 3 Experiments 2.3.1 Single Mode Fiber

Figure 12:
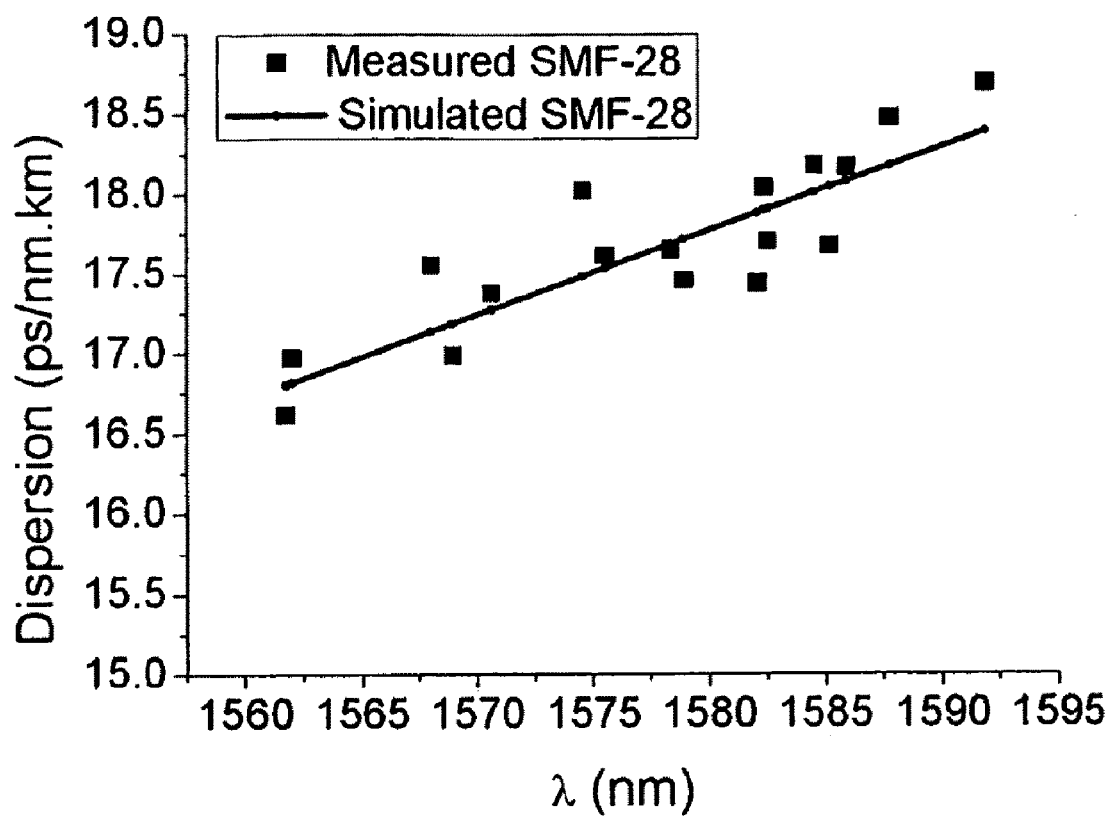
FIG. 12 illustrates the experimental results of dispersion characterization using a single arm interferometer.

The dispersion properties of SMF28™ are well known and hence it was used to verify the theory of single arm interferometry. In this experiment a 39.5±0. 1 cm piece of the SMF28™ fiber was used in a SAI in order to characterize its dispersion. FIG. 12 shows a plot of both the experimental dispersion parameter points and the simulated dispersion of SMF28™. From this figure it can be seen that the slope of the measured dispersion points closely match the simulated dispersion curve. The simulated dispersion curve for SMF28™ was calculated using the dispersion equation:

$$D(\lambda) = \frac{S_o}{4}\left[\lambda - \frac{\lambda_o^4}{\lambda^3}\right] \qquad \text{Eq. 45}$$

Where $\lambda_o$=1313 nm and $S_o$=0.086 ps/nm-km and $D(\lambda)$ is measured in ps/nm-km.

The wavelength resolution of the measured dispersion curve, as determined by Eq. 22, is 2.4 nm. The measurable bandwidth according to Eq. 29 is 30 nm, which is the bandwidth actually used, as shown in FIG. 12. The standard deviation of the measured dispersion is calculated by taking the difference between the measured points and a linear fit and then calculating the standard deviation from the difference. The standard deviation is 0.28 ps/nm-km (this corresponds to a relative error of 1.6%). When this standard deviation is multiplied by the length of the fiber, this translates into a standard deviation of 0.0001 ps/nm.

The simulated interference pattern is generated using Eq. 17 and the envelope of the interference pattern is generated using Eq. 18. In the simulation a test fiber (17) length of 0.395 m is assumed in order to match the experimental conditions. The path length of the air path (27) is determined via a calculation of the effective group index of the fiber was determined to be 1.472469 at the central wavelength, $\lambda_o$, via Eq. 46:

$$\frac{(\kappa(\lambda)a)J_{l+1}(\kappa(\lambda)a)}{J_l(\kappa(\lambda)a)} = \frac{(\gamma(\lambda)a)K_{l+1}(\kappa(\lambda)a)}{K_l(\kappa(\lambda)a)} \qquad \text{Eq. 46}$$

Where $$\kappa(\lambda) = \sqrt{n_{core}(\lambda)^2 - n_{eff}(\lambda)^2}$$

$$\gamma(\lambda) = \sqrt{n_{eff}(\lambda)^2 - n_{cladding}(\lambda)^2} \qquad \text{Eq. 47}$$

Note that a is the core size of the fiber and J and K are Bessel functions of the first and second kind. The locations of equality in Eq. 46 determine the values of $\kappa(\lambda)$ and $\gamma(\lambda)$ as well as a mode of the fiber. The first of these modes is called the fundamental mode of the fiber. The values of $n_{core}(\lambda)$ and $n_{cladding}(\lambda)$ are the index of bulk glass with the composition of the core and cladding respectively. The effective group index as a function of wavelength in SMF28™ fiber is determined using simulation.

2.3.2 Dispersion Compensating Fiber

Figure 13:
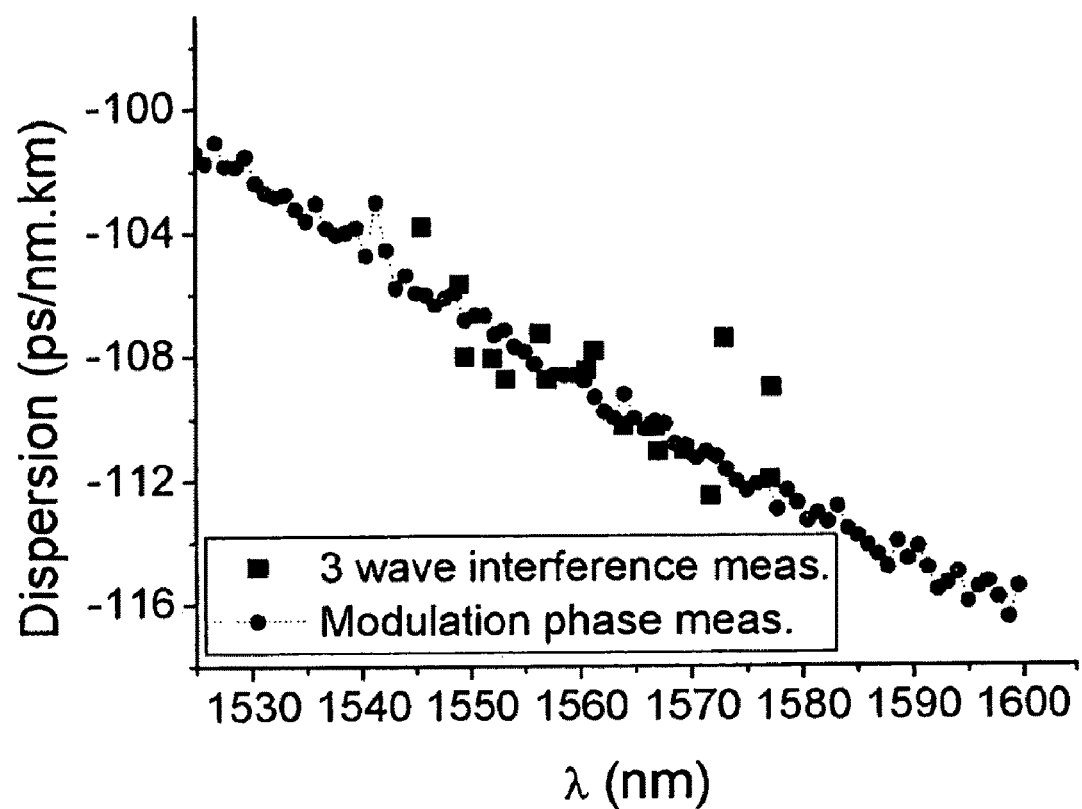
FIG. 13 illustrates the experimental results of dispersion characterization using a single arm interferometer.

As a second method of verification, dispersion was measured on a short piece of DCF, whose dispersion value is approximately one order of magnitude higher than that of SMF28™, and has an opposite sign. A 15.5±0.1 cm piece of DCF fiber was used, and the measurement results are given in FIG. 13. To verify the accuracy of the measurement, dispersion was also measured on an identical 100±0 5 m DCF using a commercial dispersion measurement system (Agilent 83427A™), which employs the MPS technique. Again, measured dispersion values are in good agreement with those measured by the commercial device, though the test fiber (17) length used is almost 3-orders of magnitude smaller.

The standard deviation of the measured dispersion is calculated by taking the difference between the measured points and a linear fit and then determining the standard deviation of the difference. The standard deviation of the measured data is 0.99 ps/nm-km, which corresponds to a relative error of 0.9%. When multiplied by the length of the test fiber (17), this translates into a standard deviation of 0.00015 ps/nm.

Since DCF has negative dispersion values a procedure for determining the sign of the dispersion was developed. By examination of Eq. 22 repeated below for convenience $$d\lambda_o = dL_{air} \frac{1}{cL_f D}$$ Eq. 48

If the sign of the dispersion is negative then the location of the central wavelength will decrease as the path length of the air path (27) is increased. This is a quick method for determining the sign of the dispersion.

2.3.3 Twin-Hole Fiber

Figure 14:
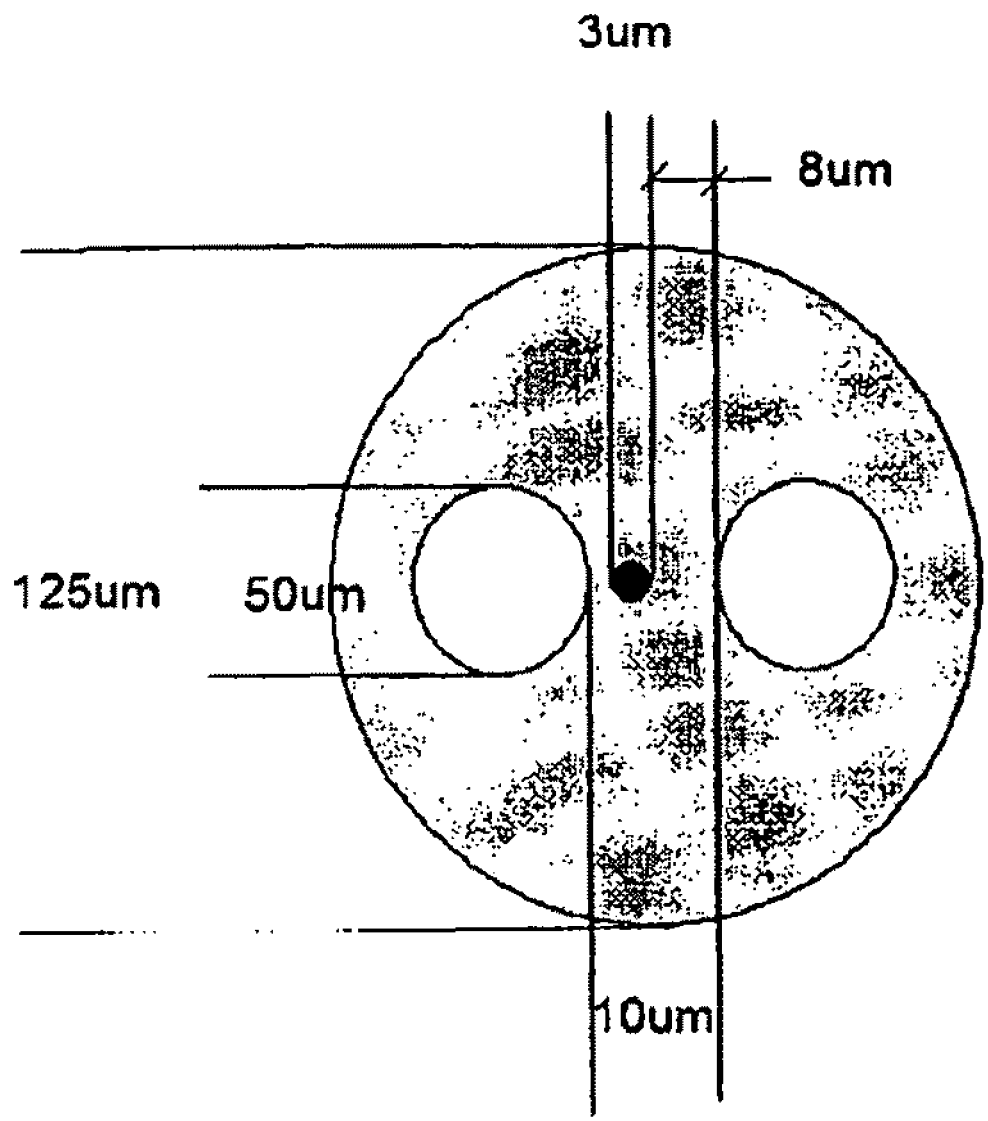
FIG. 14 illustrates the cross section of a typical twin-hole fibre.

Twin-Hole Fiber (THF) has been used in fiber poling to facilitate parametric generation in fibers or making fiber-based electro-optic switching devices. In such nonlinear applications, dispersion of the fiber is an important parameter to be determined. The dispersion properties of THF, however, have never been reported. This is partly due to the lack of uniformity in the diameter of the THF along its length. The fiber has a 3-μm-diameter core and a numerical aperture that is higher than that of SMF28™. The cross section of a typical THF is shown in FIG. 14.

The core is Ge-doped silica, and has an index similar to that of SMF28™. Therefore, the dispersion of THF is expected to be slightly lower than that of SMF28™. Without knowing the magnitude of the dispersion for THF, it is best to choose the largest length of THF available to increase the chance that the minimum bandwidth required for a measurement would fit in the available bandwidth of the tunable laser source. The largest length of THF available was 45±0.1 cm. This length of fiber is slightly longer than the length allowed by Eq. 37 but since the technique of wavelength windowing described in sections 4.5.1-4.5.3 was used the measurement of the envelope was still possible in this experiment.

Figure 15:
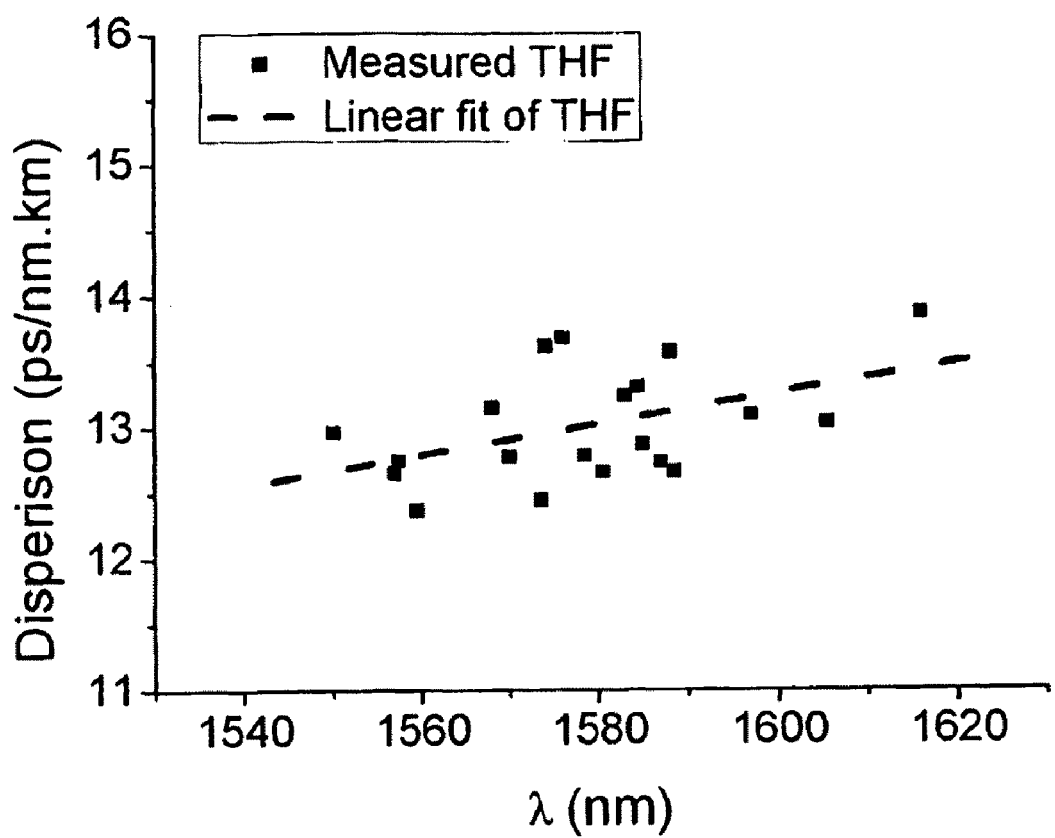
FIG. 15 illustrates the experimental results of dispersion characterization using a single arm interferometer.
Figure 16:
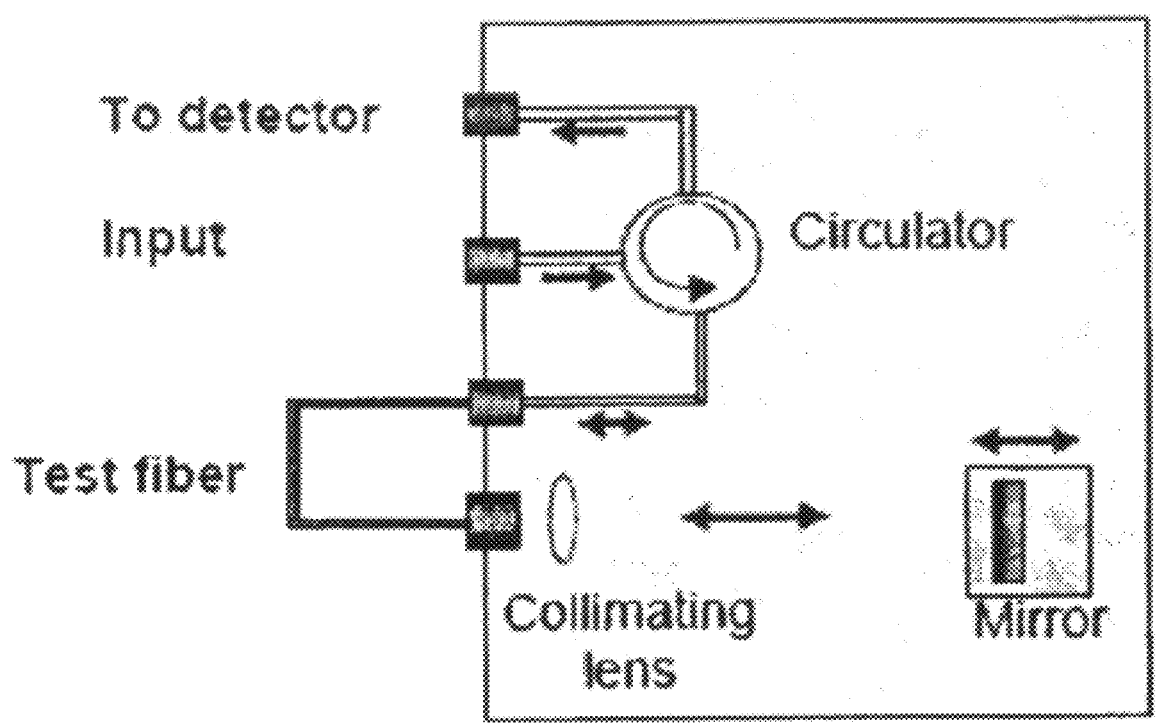
FIG. 16 illustrates an embodiment of a dispersion measurement module for a tunable laser system.

The measurement results from the experiment on THF are given in FIG. 15. The standard deviation of the measured dispersion is calculated by taking the difference between the measured points and a linear fit and then calculating the standard deviation from the difference. The standard deviation of the measured data is 0.375 ps/nm-km (which corresponds to a relative error of 2.9%). When multiplied by the fiber length, this standard deviation translates into a precision of 0.00017 ps/nm. The slightly larger standard deviation compared to those for the SMF and DCF measurement is due to the higher loss in fiber coupling between the SMF and the THF, and hence the lower and more noisy signal level during the THF measurement.

An important aspect of the previous three sections is the error associated with the measurement of each point in the dispersion parameter plots. The next section outlines the source and magnitude of the error associated with the measurement of the dispersion parameter.

In conclusion, the experimental results of Single Arm Interferometry confirm the accuracy of the present invention. They show that the dispersion parameter can be calculated from the envelope of the fringe pattern produced by the interference of 3 waves in a balanced SAI. The experiments on Single mode fiber (SMF28™) and Dispersion Compensating Fiber (DCF) were used to confirm the theory behind the technique and once the technique was confirmed it was used to measure the unknown dispersion parameter plot for THF. The length of twin-hole fiber used in the experiment was larger than allowed by Eq. 37 so the technique of wavelength windowing, described in sections 4.5.1-4.5.3, had to be used. This technique was shown theoretically and via simulation to extend the maximum length of fiber that can be characterized by this technique. Ultimately the largest length of fiber that can be characterized is limited by the largest air path (27) that can be produced in the experiment and the laser linewidth.

As mentioned, the resolution of balanced spectral interferometry, in particular, can be improved by replacing the combination broadband source and Optical Spectrum Analyzer with a tunable laser (31) and detector (23) system. Current tunable laser technology allows for a bandwidth of 130 nm and a 1 picometer resolution. This improves the range of fiber lengths that can be measured using this technique. Also of note is that the use of tunable lasers for dispersion measurement is becoming more widespread as they decrease in cost.

3: Benefits 3.1 Significance to Research

The single arm interferometer is an alternative to the Michelson or the Mach-Zehnder configuration for interferometric measurements of the dispersion parameter. It is most useful for measurements of the dispersion parameter in short lengths of fiber. The technology may be used to eliminate the need for the arm balancing required by dual arm interferometers and by doing so allow for greater ease in the use of interferometric dispersion measurement techniques.

The new interferometer is significant for researchers since it can be studied and used alongside the earlier types of interferometers like the Michelson, the Mach-Zehnder and the Fabry Perot. This new interferometer provides researchers with another tool for studying dispersion in short length fibers and waveguides which will be useful in the development of specialty fibers. These specialty fibers require simple and accurate short length characterization since they are generally made in very small quantities and their geometry tends to vary as a function of position along the fiber.

3.2 Significance to Industry

The new interferometer is significant to industry since it minimizes the need to compensate for unwanted reflections by eliminating the need for a coupler altogether. As a result this interferometer is a simpler (less expensive) interferometric dispersion measurement device capable of characterizing the dispersion of short length optical fiber. As a result it is a viable commercial competitor to the current Modulation Phase Shift (MPS) based devices currently on the market. The new interferometer, however, has an advantage over MPS based devices since it has the ability to measure short length fiber with high accuracy.

Also, since it can measure short lengths of fiber it has the ability for another type of measurement as well. Dispersion is a function of both material and dimensional (waveguide) properties of a fiber but if the dimensions, particularly the diameter of the fiber, vary then the dispersion will vary. If several small sections can be cut from various points on a long length fiber and the dispersion is measured in each of them then the variation in the dispersion can be plotted as a function of position in the fiber. This can then be directly related to the variation in the fiber diameter. The main point here is that a great deal of accuracy in measuring the fiber diameter can be achieved by measuring it indirectly via the dispersion and it would be an easy way for a fiber drawing company to perform quality control.

Greater commercial interest in this device will enable measurement of dispersion in smaller lengths of fiber since larger bandwidth tunable lasers will be developed. Also the advancement in the speed of the tunable laser and scanning process will make each measurement faster to obtain.

3.3 Module

One of the most interesting features of a single arm interferometer is the ease with which it can be built. This ease of construction lends itself very nicely to economical commercial assembly of a dispersion measurement device, such as an add-on module for a tunable laser system to allow it to make dispersion measurements. A conceptual design of such a module is illustrated in FIG. 16.

What is claimed is:

1. An interferometer system for obtaining a measure of the chromatic dispersion of a waveguide comprising:
   a. a radiation source operable to emit radiation connected to a means for separating incident and reflected waves;
   b. the means for separating incident and reflected waves having an output arm adjacent to a first end of the waveguide;
   c. the means for separating incident and reflected waves further connected to a detector;
   d. a collimating means positioned at a second end of the waveguide; and
   e. a reflecting means positioned at a balanced distance from the collimating means operable to reflect a test emission from the radiation source back through the collimating means, the waveguide, and the means for separating incident and reflected waves thereby generating an interference pattern that is recorded by the detector.

2. The interferometer system as claimed in claim 1 wherein said interference pattern consists of three waves wherein a first wave is a reflection of the test emission from one facet of the waveguide, a second wave is a reflection of the test emission from a second facet of the waveguide and a third wave is a reflection of the test emission from the reflecting means.

3. The interferometer system as claimed in claim 1 wherein said means for separating incident and reflected waves is a circulator.

4. The interferometer system as claimed in claim 1 wherein said means for separating incident and reflected waves is a 2-to-1 coupler.

5. The interferometer system as claimed in claim 1 wherein said interferometer is in the form of a single arm interferometer.

6. The interferometer system as claimed in claim 1 wherein said radiation source is a tunable laser.

7. The interferometer system as claimed in claim 6 wherein a maximum length of the waveguide for which the measure may be obtained is limited by a minimum step size of the tunable laser.

8. The interferometer system as claimed in claim 1 wherein said optical detector is an optical spectrum analyser.

9. The interferometer system as claimed in claim 1 wherein the output arm of the means for separating incident and reflected waves comprises a launch waveguide terminating at an angle polished connector.

10. The interferometer system as claimed in claim 9 wherein the angle polished connector is cleaved at an angle to minimize reflection back to the circulator.

11. The interferometer system as claimed in claim 9 wherein the angle polished connector is aligned to the waveguide using a fastening means.

12. The interferometer system as claimed in claim 11 wherein the fastening means is operable to prevent damage to the angled polished connector by minimizing contact with the waveguide.

13. The interferometer system as claimed in claim 11 wherein the fastening means is a fiber connecting pin.

14. The interferometer system as claimed in claim 9 operable to obtain a measure of the polarization mode dispersion of a waveguide comprising manipulating the launch waveguide such that it forms three coils, each said coil including a 360° turn.

15. The interferometer system as claimed in claim 1 wherein the connecting end of the waveguide is a flat polished connector.

16. The interferometer system as claimed in claim 1 wherein the collimating means is a collimating lens.

17. The interferometer system as claimed in claim 1 wherein the reflecting means is a mirror.

18. The interferometer system as claimed in claim 1 wherein the waveguide is selected from a group consisting of optical fiber, photonic crystal fiber, nanowire, nanofiber and etched waveguide.

19. The interferometer system as claimed in claim 18 wherein the waveguide is a single mode fiber.

20. The interferometer system as claimed in claim 18 wherein the waveguide is a twin-hole fiber.

21. The interferometer system as claimed in claim 18 wherein the waveguide is a dispersion compensating fiber.

22. The interferometer system as claimed in claim 18 wherein the waveguide is a gain fiber.

23. The interferometer system as claimed in claim 1 wherein a minimum length of the waveguide for which the measure may be obtained is limited by a bandwidth of the radiation source.

24. The interferometer system as claimed in claim 23 wherein the bandwidth of the radiation source is in the order of hundreds of nanometers and the minimum length of the waveguide is in the order of tens of centimeters.

25. The interferometer system as claimed in claim 1 wherein the interferometer may be modularized and inserted into a broadband source.

26. The interferometer system as claimed in claim 1 wherein the interferometer may be modularized and connected to a lightwave measurement system.

27. The interferometer system as claimed in claim 1 operable to obtain a measure of the polarization mode dispersion of a waveguide comprising placing a linear polarizer between the collimating means and the reflecting means, said linear polarizer oriented at an angle, between 0 and 90° to a path of the test emission.

28. An interferometric method for obtaining a measure of the chromatic dispersion of a waveguide comprising the steps of:
   a. connecting a radiation source to a means for separating incident and reflected waves, said means for separating incident and reflected waves having an output arm terminating at a connector;
   b. placing a first facet of the waveguide adjacent to the connector;
   c. connecting the means for separating incident and reflected waves to a detector;
   d. placing a collimating lens at a second facet of the waveguide;
   e. positioning a reflecting means at a balanced distance from the collimating lens;
   f. generating a radiation emission from the radiation source;
   g. recording an interferogram consisting of three waves with the detector wherein the first wave is a reflection of the radiation emission from the first facet of the waveguide, the second wave is a reflection of the radiation emission from the second facet of the waveguide, and the third wave is a reflection of the radiation emission from the reflecting means; and
   h. measuring dispersion parameters from the recorded interferogram.

29. The interferometric method as claimed in claim 28 wherein the interferometer is single-arm.

30. An interferometric method for obtaining a measure of the chromatic dispersion of an external waveguide to a modular interferometer comprising the steps of:
  a. generating a modular interferometer including:
    i. a first input operable to connect an external radiation source to an internal means for separating incident and reflected waves;
    ii. a second input operable to connect an external detector to the internal means for separating incident and reflected waves;
    iii. a duo-input wherein a third input is operable to connect a first facet of the waveguide to the internal means for separating incident and reflected waves and wherein a fourth input is operable to place a second facet of the waveguide in close proximity to an internal collimating means wherein an internal reflecting means is positioned at a distance to said internal collimating means;
  b. connecting a first facet of the waveguide to the third input;
  c. connecting a second facet of the waveguide to the fourth input;
  d. generating a radiation emission from the external radiation source;
  e. recording an interferogram consisting of three waves with the external detector wherein a first wave is a reflection of the radiation emission from the first facet of the waveguide, a second wave is a reflection of the radiation emission from the second facet of the waveguide, and a third wave is a reflection of the radiation emission from the reflecting means; and
  f. measuring dispersion parameters from the recorded interferogram.

* * * * *